United States Patent
Kobayashi

(10) Patent No.: US 9,233,489 B2
(45) Date of Patent: Jan. 12, 2016

(54) MANUFACTURING METHOD AND MANUFACTURING APPARATUS OF HIGH-PRESSURE GAS TANK

(75) Inventor: Tomoyoshi Kobayashi, Toyota (JP)

(73) Assignee: TOYOTA JIDOSHA KABUSHIKI KAISHA, Toyota-Shi (JP)

(*) Notice: Subject to any disclaimer, the term of this patent is extended or adjusted under 35 U.S.C. 154(b) by 505 days.

(21) Appl. No.: 13/574,763

(22) PCT Filed: Oct. 18, 2011

(86) PCT No.: PCT/JP2011/005811
§ 371 (c)(1),
(2), (4) Date: Jul. 23, 2012

(87) PCT Pub. No.: WO2013/057753
PCT Pub. Date: Apr. 25, 2013

(65) Prior Publication Data
US 2013/0092311 A1    Apr. 18, 2013

(51) Int. Cl.
*B29C 35/02*    (2006.01)
*F17C 1/06*    (2006.01)
(Continued)

(52) U.S. Cl.
CPC .............. *B29C 35/02* (2013.01); *B29C 37/0064* (2013.01); *B29C 70/086* (2013.01); *B29C 70/32* (2013.01); *B29C 70/326* (2013.01); *B29C 70/86* (2013.01); *F17C 1/06* (2013.01); *B29K 2101/10* (2013.01); *B29K 2307/04* (2013.01); *F17C 2201/0109* (2013.01); *F17C 2203/067* (2013.01); *F17C 2203/0607* (2013.01); *F17C 2203/0619* (2013.01); *F17C 2203/0665* (2013.01);
(Continued)

(58) Field of Classification Search
CPC ......... B32B 38/10; B65H 81/02; B29C 70/86
USPC ............................................ 156/64, 172, 425
See application file for complete search history.

(56) References Cited

U.S. PATENT DOCUMENTS 3,313,670 A    4/1967    Sherwood
3,480,499 A    11/1969    Paul, Jr.
(Continued)

FOREIGN PATENT DOCUMENTS

DE    1219213 B    6/1966
DE    1806108 A    8/1969
(Continued)

OTHER PUBLICATIONS

Machine translation of JP 2010-264718, Nov. 25, 2010, Toyota Motor Company.*
(Continued)

*Primary Examiner* — George Koch
(74) *Attorney, Agent, or Firm* — Kenyon & Kenyon LLP

(57) ABSTRACT

A thermal curing device is used to manufacture a high-pressure gas tank by FW method. In the thermal curing device, a tank vessel configured to have a fiber layer formed on its outer surface by winding carbon fibers impregnated with a thermosetting resin is held to be rotatable about a virtual central axis of the tank vessel. In the thermal curing device, the tank vessel is heated by a heating unit during rotation, so as to thermally cure the thermosetting resin in the fiber layer and thereby form a fiber-reinforced resin layer. A bubble removal process for preventing formation of air bubble in the fiber-reinforced resin layer is performed at multiple different stages during such heating.

21 Claims, 17 Drawing Sheets

(51) Int. Cl.
  *B29C 37/00*   (2006.01)
  *B29C 70/32*   (2006.01)
  *B29C 70/86*   (2006.01)
  *B29C 70/08*   (2006.01)
  *B29K 307/04*   (2006.01)
  *B29K 101/10*   (2006.01)

(52) U.S. Cl.
  CPC . *F17C2205/0397* (2013.01); *F17C 2209/2154* (2013.01); *F17C 2209/225* (2013.01); *F17C 2260/012* (2013.01); *F17C 2270/0184* (2013.01)

(56) References Cited

U.S. PATENT DOCUMENTS

| 3,594,247 A | 7/1971 | Pennington et al. |
| 6,190,481 B1 | 2/2001 | Iida et al. |

FOREIGN PATENT DOCUMENTS

| DE | 1704710 A | 5/1971 |
| DE | 69530126 T2 | 3/2003 |
| JP | 61149277 A | 7/1986 |
| JP | 197605 A | 4/1989 |
| JP | 9-203496 A | 8/1997 |
| JP | 10-029689 A | 2/1998 |
| JP | 2003-053853 A | 2/2003 |
| JP | 2009-174700 A | 8/2009 |
| JP | 2010-125825 A | 6/2010 |
| JP | 2010-125826 A | 6/2010 |
| JP | 2010-223243 A | 10/2010 |
| JP | 2010-264718 A | 11/2010 |

OTHER PUBLICATIONS

English-language machine translation of Japanese Application No. 2010-125826A, previously disclosed without machine translation on Jul. 23, 2012, Jun. 10, 2010.

English-language machine translation of Japanese Application No. 2010-125825A, previously disclosed without machine translation on Jul. 23, 2012, Jun. 10, 2010.

International Search Report issued Nov. 22, 2011 in PCT/JP2011/005811.

* cited by examiner

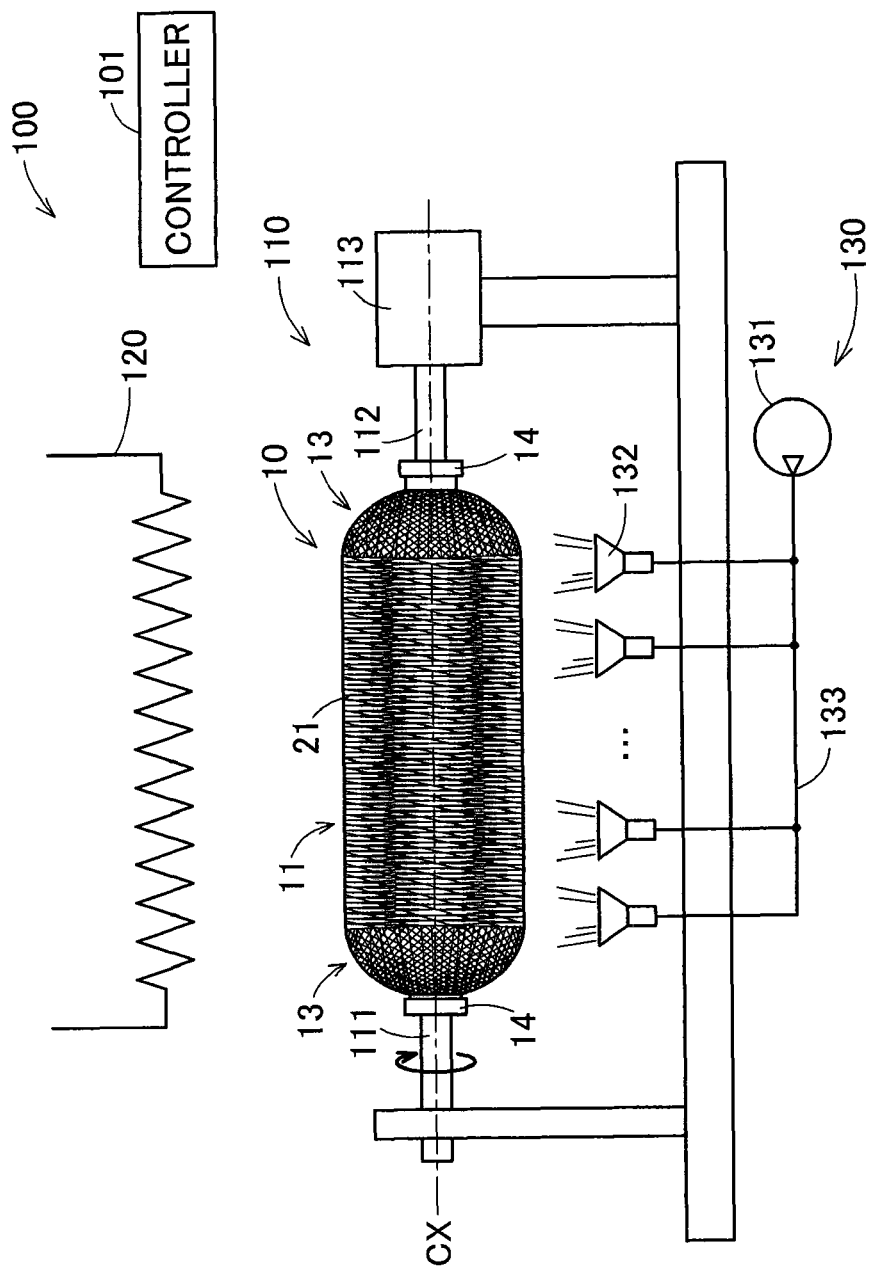

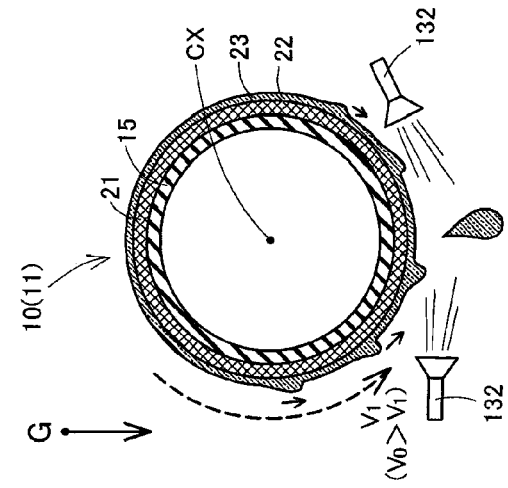
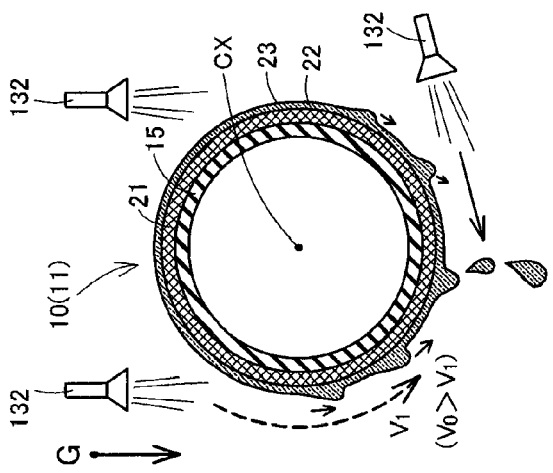
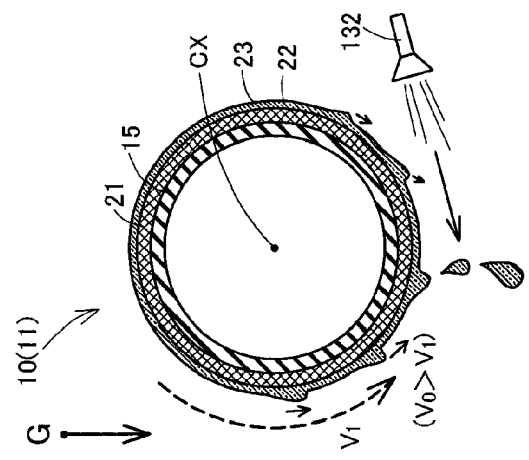

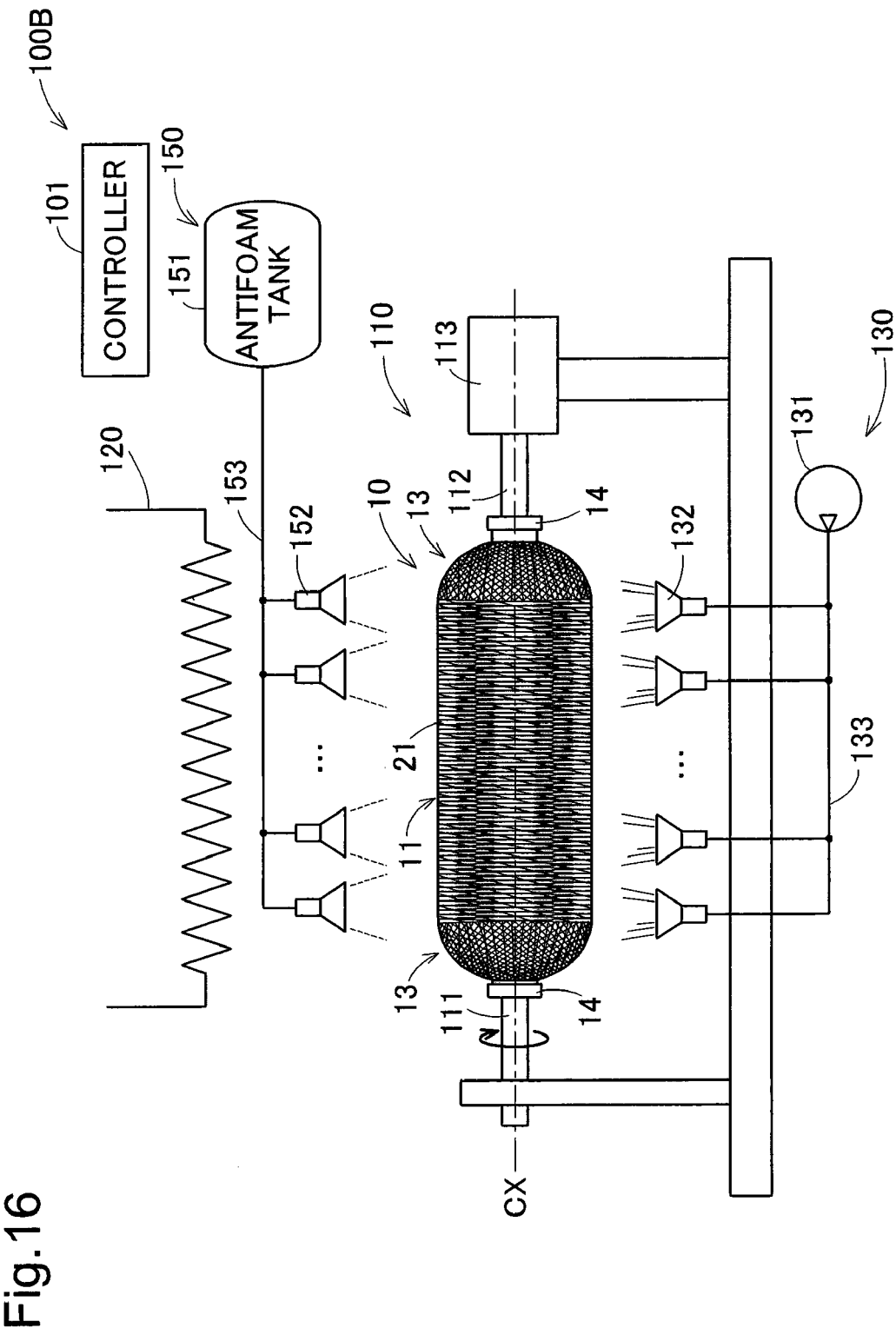

MANUFACTURING METHOD AND MANUFACTURING APPARATUS OF HIGH-PRESSURE GAS TANK

This is a 371 national phase application of PCT/JP2011/005811 filed 18 Oct. 2011, the contents of which are incorporated herein by reference.

TECHNICAL FIELD

The present invention relates to a high-pressure gas tank.

BACKGROUND ART

In some applications, a high-pressure gas tank may be mounted on a moving body, such as a fuel cell vehicle, and there is accordingly a demand to reduce the weight of the high-pressure tank. The manufacturing method of the high-pressure gas tank by filament winding method (hereinafter referred to as "FW method") is known as one method of reducing the weight of the high-pressure gas tank (see, for example, PTL1). The manufacturing method of the high-pressure gas tank by the FW method winds reinforcement fibers impregnated with a thermosetting resin, such as an epoxy resin, on the outer periphery of a resin tank vessel called liner and then thermally cures the thermosetting resin of the reinforcement fibers to form a fiber-reinforced resin layer.

In the FW method, however, during the thermal curing process of the thermosetting resin, the air contained inside the thermosetting resin or between the reinforcement fibers may gradually move outward to form air bubbles and cause resulting irregularities on the surface of the fiber-reinforced resin layer. The irregularities caused by the air bubbles on the surface layer of the high-pressure gas tank may cause the dimension error of the high-pressure gas tank and the resulting poor assembly of the high-pressure gas tank. Such irregularities on the surface layer may also adversely affect the aesthetic appearance of the high-pressure gas tank.

CITATION LIST

Patent Literatures

PTL 1: JP 2010-223243
PTL 2: JP H09-203496
PTL 3: JP 2009-174700

SUMMARY OF INVENTION

Technical Problem

Consequently, there is a need to reduce air bubbles that may be formed in the surface of a fiber-reinforced resin layer on a high-pressure gas tank.

Solution to Problem

In order to achieve at least part of the foregoing, the present invention provides various aspects and embodiments described below.

[Aspect 1]
A manufacturing method of a high-pressure gas tank, comprising steps of:
(a) providing a tank vessel configured to have a fiber layer formed on outer surface of the tank vessel by winding reinforcement fibers impregnated with a thermosetting resin; and
(b) performing a thermal curing process that heats the tank vessel to thermally cure the thermosetting resin and thereby form a fiber-reinforced resin layer, and performing a bubble removal process for preventing formation of air bubble in the fiber-reinforced resin layer, at multiple different stages during the thermal curing process.

The manufacturing method of this aspect performs the bubble removal process at multiple different stages during heating of the tank vessel to thermally cure the thermosetting resin. This effectively prevents formation of air bubbles in the fiber-reinforced resin layer. More specifically, this does not require any additional surface treatment to finish up the surface of the fiber-reinforced resin layer after the thermosetting resin is cured.

[Aspect 2]
The manufacturing method according to aspect 1, wherein the multiple different stages are set in advance according to a variation in viscosity of the thermosetting resin.

The manufacturing method of this aspect performs the adequate bubble removal process in a step-wise manner according to the variation in viscosity of the thermosetting resin during the thermal curing process, thus more effectively preventing formation of air bubbles.

[Aspect 3]
The manufacturing method according to aspect 1, wherein the step (b) includes detecting state of the thermosetting resin and determining details of the bubble removal process, based on the detected state.

The manufacturing method of this aspect adequately determines the details of the bubble removal process according to the state of the thermosetting resin during the thermal curing process and performs the bubble removal process of the determined details at the multiple different stages. Performing the adequate bubble removal process according to the actual state change of the thermosetting resin more effectively prevents formation of air bubbles. The "state of the thermosetting resin" may include, for example, the viscosity, the fluidity and the flow amount of the thermosetting resin, the state of air bubble formation, e.g., the number and the size of air bubbles formed in the thermosetting resin, and the thickness of a coat of the thermosetting resin formed on the surface of the tank vessel. The "details of the bubble removal process" may include, for example, the type of the bubble removal process, the process time, the start timing of the process, the materials and the equipment used for the process and other process conditions.

[Aspect 4]
The manufacturing method according to any one of aspects 1 to 3, wherein the bubble removal process includes a first process that causes the thermosetting resin located on outer surface of the fiber layer to be removed by an external force from the tank vessel, when viscosity of the thermosetting resin changes to a specified viscosity level.

The manufacturing method of this aspect reduces the amount of the thermosetting resin contained in the surface of the fiber layer during the thermal curing process, thereby decreasing the quantity of air bubbles formed in the surface layer of the thermosetting resin.

[Aspect 5]
The manufacturing method according to aspect 4, wherein the thermal curing process includes rotating the tank vessel during heating at a specified rotational speed, and the first process includes decreasing rotational speed of the tank vessel when the viscosity of the thermosetting resin changes to a first viscosity as the specified viscosity level and thereby facilitating the thermosetting resin located on the outer surface of the fiber layer to flow and fall by gravity from the outer surface of the fiber layer in direction of gravity.

The manufacturing method of this aspect takes advantage of gravity to efficiently reduce the amount of the thermosetting resin contained in the surface of the fiber layer.

[Aspect 6]

The manufacturing method according to either one of aspects 4 and 5, wherein the first process includes spraying a fluid to apply an external force to the thermosetting resin located on the outer surface of the fiber layer, so as to remove the thermosetting resin from the fiber layer.

The manufacturing method of this aspect sprays the fluid to apply an external for to the thermosetting resin, thus effectively reducing the amount of the thermosetting resin contained in the surface of the fiber layer.

[Aspect 7]

The manufacturing method according to any one of aspects 4 to 6, wherein the first process includes applying a solvent, which is capable of dissolving the thermosetting resin, onto surface of the fiber layer, so as to facilitate flow of the thermosetting resin.

The manufacturing method of this aspect promotes the flow of the thermosetting resin contained in the surface of the fiber layer, thus facilitating removal of the thermosetting resin from the surface of the fiber layer.

[Aspect 8]

The manufacturing method according to any one of aspects 1 to 7, wherein the bubble removal process includes a second process that sprays a fluid to break air bubble formed in the thermosetting resin located on outer surface of the fiber layer.

The manufacturing method of this aspect sprays the fluid to directly break the air bubbles formed in the fiber layer during the thermal curing process, thus reducing the air bubbles remaining in the surface of the fiber-reinforced resin layer.

[Aspect 9]

The manufacturing method according to aspect 8 dependent on any one of aspects 4 to 7, wherein the second process is performed after a start of the first process and after the viscosity of the thermosetting resin changes to a specified second viscosity that is higher than the first viscosity.

The manufacturing method of this aspect performs the first process based on the fluidity when the thermosetting resin has sufficient fluidity, while performing the second process to break the air bubbles after the fluidity decreases. The adequate combination of the processes is thus performed in a step-wise manner according to the variation in viscosity of the thermosetting resin. This more effectively prevents formation of air bubbles in the fiber-reinforced resin layer.

[Aspect 10]

The manufacturing method according to any one of aspects 1 to 9, wherein the bubble removal process includes a third process that applies a resin solution serving as antifoam onto surface of the fiber layer.

The manufacturing method of this aspect applies the antifoam during the thermal curing process, thus effectively preventing formation of air bubbles.

[Aspect 11]

The manufacturing method according to aspect 10, wherein the third process is performed at least a timing after a variation in viscosity of the thermosetting resin changes from a decreasing tendency to an increasing tendency.

The manufacturing method of this aspect applies the antifoam after the fluidity of the thermosetting resin decreases. This prevents the antifoam from being flowed out and removed with the thermosetting resin from the surface of the fiber layer, thus avoiding reduction of the antifoam effect.

[Aspect 12]

The manufacturing method according to either one of aspects 10 and 11, wherein the third process is performed:

(i) at a first timing when a variation in viscosity of the thermosetting resin is in a decreasing tendency;

(ii) at a second timing after the variation in viscosity of the thermosetting resin changes from the decreasing tendency to an increasing tendency; and (iii) at a third timing after the viscosity of the thermosetting resin increases above a viscosity level at the second timing.

The manufacturing method of this aspect applies the antifoam at the adequate timings during the thermal curing process, thus ensuring the antifoam effect of the antifoam.

[Aspect 13]

The manufacturing method according to aspect 10 dependent on aspect 9, wherein the third process is performed at a timing after a start of the first process but before a start of the second process and at a timing when the viscosity of the thermosetting resin changes to the specified second viscosity.

The manufacturing method of this aspect performs the third process at the adequate timings, in combination with the first process and the second process. This more effectively prevents formation of air bubbles in the fiber-reinforced resin layer.

[Aspect 14]

A manufacturing apparatus of a high-pressure gas tank, comprising: a thermal curing process module configured to heat a tank vessel, which has a fiber layer formed on outer surface of the tank vessel by winding reinforcement fibers impregnated with a thermosetting resin, so as to thermally cure the thermosetting resin and thereby form a fiber-reinforced resin layer; and a bubble removal process module configured to perform a bubble removal process for preventing formation of air bubble in the fiber-reinforced resin layer at multiple different stages, while the tank vessel is heated by the thermal curing process module.

In the manufacturing apparatus of this aspect, the bubble removal process module performs the bubble removal process at multiple different stages during the thermal curing process by the thermal curing process module. This effectively prevents formation of air bubbles in the fiber-reinforced resin layer on the tank vessel.

[Aspect 15]

The manufacturing apparatus according to aspect 14, wherein the multiple different stages are set in advance according to a variation in viscosity of the thermosetting resin.

The manufacturing apparatus of this aspect performs the bubble removal process at adequate stages according to the variation in viscosity of the thermosetting resin during the thermal curing process.

[Aspect 16]

The manufacturing apparatus according to aspect 14, wherein the thermal curing process module includes a process determiner configured to detect state of the thermosetting resin and determine details of the bubble removal process, based on the detected state.

The manufacturing apparatus of this aspect adequately determines the details of the bubble removal process according to the state of the thermosetting resin during the thermal curing process by the thermal curing process module and performs the bubble removal process of the determined details at multiple different stages. This enables the adequate bubble removal process to be performed according to the actual state change of the thermosetting resin, thus more effectively preventing formation of air bubbles.

[Aspect 17]

The manufacturing apparatus according to any one of aspects 14 to 16, wherein the bubble removal process module performs a first process that causes the thermosetting resin located on outer surface of the fiber layer to be removed by an external force from the tank vessel, when viscosity of the thermosetting resin changes to a specified viscosity level.

The manufacturing apparatus of this aspect reduces the amount of the thermosetting resin contained in the surface of the fiber layer during the thermal curing process by the thermal curing process module, thereby decreasing the quantity of air bubbles formed in the surface layer of the thermosetting resin.

[Aspect 18]

The manufacturing apparatus according to any one of aspects 14 to 17, wherein the bubble removal process module includes a fluid spray module configured to perform a second process that sprays a fluid to break air bubble formed in the thermosetting resin located on outer surface of the fiber layer.

The manufacturing apparatus of this aspect sprays the fluid to directly break the air bubbles formed in the fiber layer during the thermal curing process, thus reducing the air bubbles remaining in the surface of the fiber-reinforced resin layer.

[Aspect 19]

The manufacturing apparatus according to any one of aspects 14 to 18, wherein the bubble removal process module includes an antifoam application module configured to apply a resin solution serving as antifoam onto surface of the fiber layer.

The manufacturing apparatus of this aspect applies the antifoam during the thermal curing process, thus effectively preventing formation of air bubbles.

The present invention may be implemented by diversity of aspects, for example, the manufacturing method and the manufacturing apparatus of the gas tank, computer programs executed to implement the functions of the method and the device, and storage media, in which such computer programs are stored. The invention may also be actualized by a gas tank manufactured by the manufacturing method or the manufacturing apparatus of the gas tank, a system, such as a fuel cell system, including such a gas tank, and a vehicle equipped with such a gas tank.

BRIEF DESCRIPTION OF DRAWINGS

FIG. 3 schematically illustrates the structure of a thermal curing device, in which thermal curing process is performed;

FIGS. 9A to 9C are diagrams illustrating the operation by an air spray unit performed in the first bubble removal process;

FIG. 16 schematically illustrates the structure of a thermal curing device according to a third embodiment.

DESCRIPTION OF EMBODIMENTS

A. First Embodiment

Figure 1:
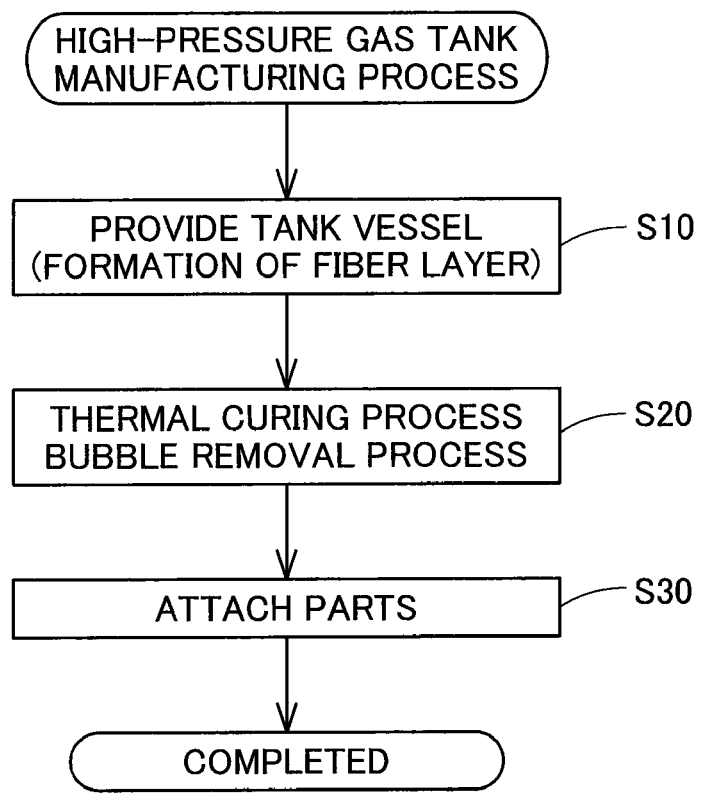
FIG. 1 illustrates the procedure of high-pressure gas tank manufacturing process by FW method.

FIG. 1 is a flowchart showing the procedure of high-pressure gas tank manufacturing process by filament winding method according to one embodiment of the invention. In the manufacturing process of the embodiment, the first step provides a tank vessel called "liner", which constitutes the main body of a high-pressure gas tank (step S10). At this step, a fiber layer made of reinforcement fibers impregnated with a thermosetting resin is formed on the outer surface of the tank vessel as described below.

The second step performs thermal curing process, which heats the tank vessel with the fiber layer formed thereon to thermally cure the thermosetting resin in the fiber layer and change the fiber layer to fiber-reinforced resin layer (step S20). The second step also performs bubble removal process, which prevents bubbles from forming in the fiber-reinforced resin layer, during the thermal curing process. The bubble removal process starts different series of processing at a plurality of predetermined stages according to the viscosity of the thermosetting resin as described later in detail. The third step attaches relevant parts, such as specific fittings, to the tank vessel (step S30). This completes the high-pressure tank.

Figure 2A:
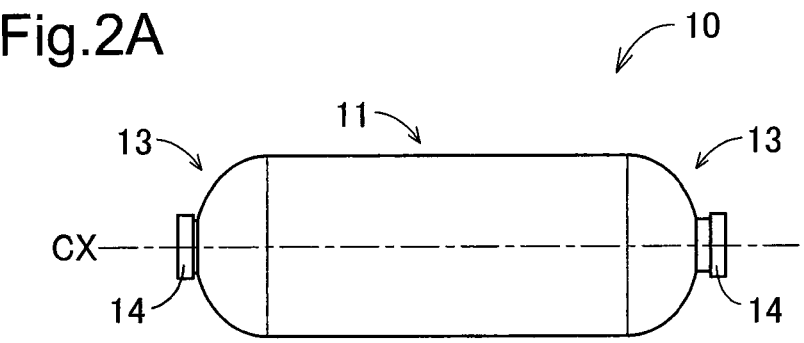
FIGS. 2A to 2C are diagrams illustrating a step of providing a tank.
Figure 2B:
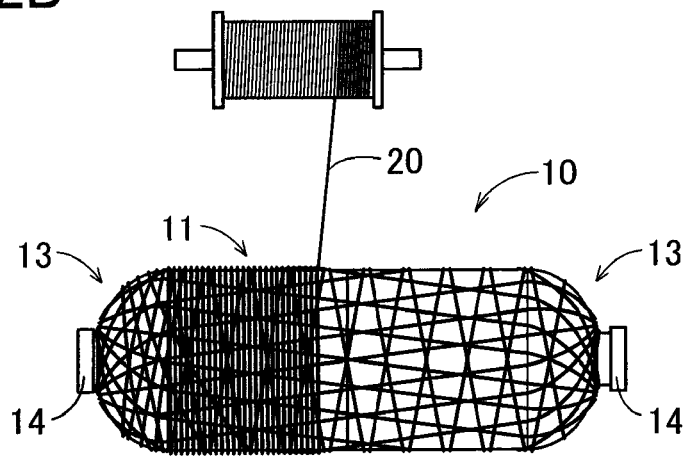
Figure 2C:
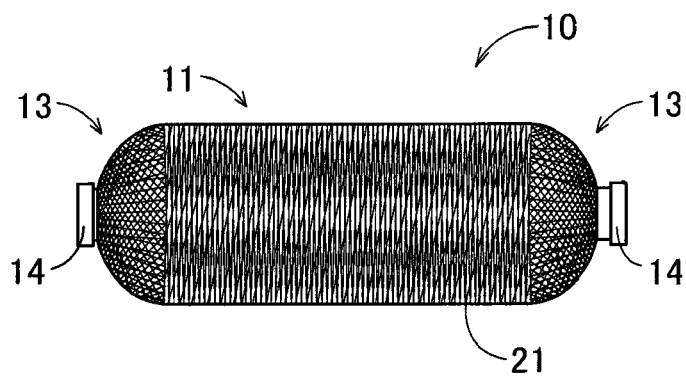

FIGS. 2A to 2C schematically illustrate one example of the first step or the step of providing the tank vessel. FIG. 2A illustrates the tank vessel 10 before formation of a fiber layer. The tank vessel 10 is a hollow vessel configured to have a cylinder section 11 in a substantially cylindrical shape and two dome sections 13 in a substantially hemispherical shape provided on both ends of the cylinder section 11. The tank vessel 10 may be composed of a resin, for example, nylon resin.

The apexes of the two dome sections 13 are located on one identical central axis CX (shown by the chain line) of the tank vessel 10. Mouthpiece bases 14, to which pipes and valves are attached at the third step (step S30 in FIG. 1), are provided on the apexes of the respective dome sections 13. According to other embodiments, the tank vessel 10 may be formed in a different shape and may have different parts.

FIG. 2B illustrates the process of winding carbon fibers 20 on the outer surface of the tank vessel 10 to form a fiber layer 21. FIG. 2C illustrates the tank vessel 10 after formation of the fiber layer 21. In the manufacturing process of the embodiment, the step of providing the tank vessel 10 winds the carbon fibers 20 as reinforcement fibers to form the fiber layer 21 that covers the outer surface of the cylinder section 11 and the dome sections 13. The carbon fibers 20 are impregnated in advance with an epoxy resin as the thermosetting resin. Winding the carbon fibers 20 may be combination of hoop winding and helical winding.

FIG. 3 schematically illustrates the structure of a thermal curing device 100, in which the thermal curing process and the bubble removal process are performed at the second step. The thermal curing device 100 includes a controller 101, a base assembly 110, a heating unit 120 and an air spray unit 130. The controller 101 is constructed by a microcomputer including a main storage unit and a central processing unit and controls the operations of the respective components of the thermal curing device 100 described below.

The base assembly 110 has tank fixing elements 111 and 112 in the form of shafts to hold both ends of the tank vessel 10, such that the tank vessel 10 is rotatable about the central axis CX of the tank vessel 10 at a specified rotational speed. The base assembly 110 also includes a rotary drive unit 113 configured to apply rotational driving force to the tank vessel 10 across the tank fitting elements 111 and 112, in response to a command from the controller 101.

The heating unit 120 is provided to heat the whole tank vessel 10 rotated by the rotary drive unit 113 at a predetermined temperature (for example, about 130° C.). The air spray unit 130 includes a pump 131 configured to output the compressed air and a plurality of nozzles 132 arranged to spray the compressed air output from the pump 131 toward the tank vessel 10. The respective nozzles 132 are arranged in parallel with one another via the pump 131 and piping 133. The air spray unit 130 is used for the bubble removal process as described later in detail.

In the thermal curing process performed in the thermal curing device 100, the tank vessel 10 attached to the tank fitting elements 111 and 112 is heated for about 7 to 8 hours by the heating unit 120, while being rotated at the specified rotational speed by the rotary drive unit 113. This thermally cures the thermosetting resin, with which the carbon fibers 20 are impregnated. During this thermal curing process, bubbles may be formed in the thermosetting resin of the fiber layer 21. The following describes a change of the fiber layer 20 and potential formation of bubbles during the thermal curing process in detail.

Figure 4A:
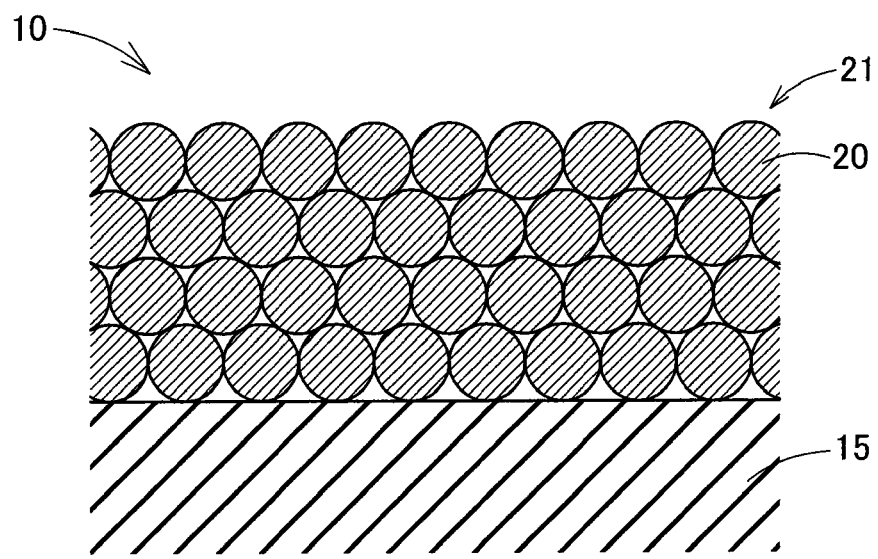
FIGS. 4A and 4B are diagrams illustrating the mechanism of formation of air bubbles during the thermal curing process, in detail.
Figure 4B:
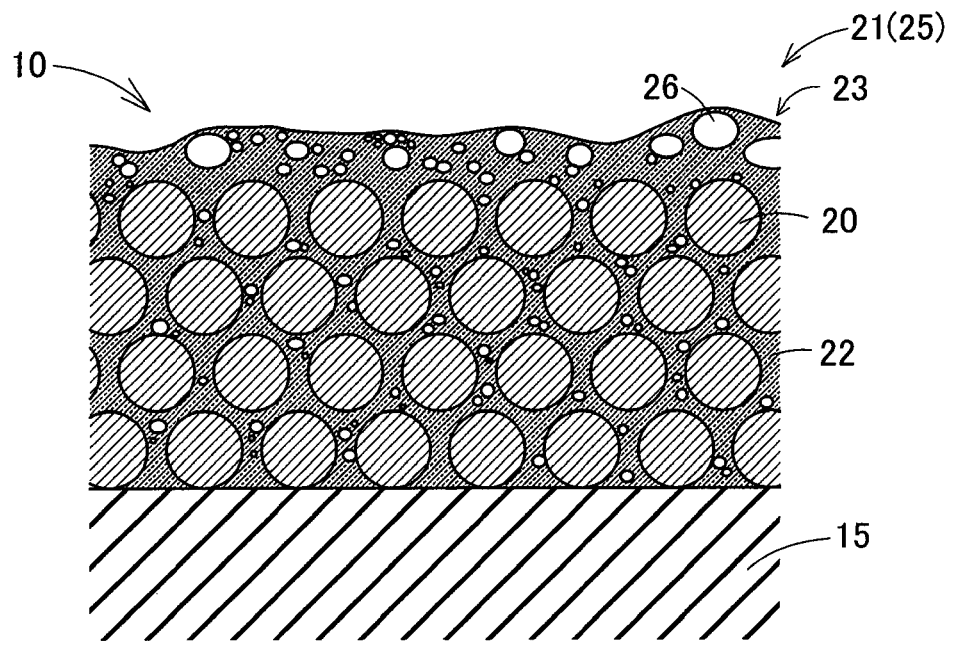

FIGS. 4A and 4B are diagrams illustrating the mechanism of formation of bubbles during the thermal curing process, in detail. FIG. 4A schematically illustrates the cross section of the tank vessel 10 before the thermal curing process. FIG. 4B schematically illustrates the cross section of the tank vessel 10 during the thermal curing process. In the tank vessel 10 before thermal curing process, the fiber layer 21 is formed by tightly winding the carbon fibers 20 in multiple layers (FIG. 4A).

During the thermal curing process, on start of heating the tank vessel 10, the thermosetting resin 22, with which the carbon fibers 20 are impregnated, decreases the viscosity to start fluidizing and is released out of the carbon fibers 20 (FIG. 4B). Fluidization of the thermosetting resin 22 decreases the tension (tensile force) of the carbon fibers 20 in the fiber layer 21 and thereby increases the gaps between the carbon fibers 20. The thermosetting resin 22 starts being released through the gaps between the carbon fibers 20 toward the outer surface (surface layer) of the fiber layer 21.

A resin coat 23 of the thermosetting resin 22 is formed on the surface of the fiber layer 21. Under continuous application of heat by the heating unit 120, the cross-linking reaction of the thermosetting resin 22 proceeds to cure the thermosetting resin 22 of the fiber layer 21. In the description hereinafter, the fiber layer 21 after curing of the thermosetting resin 22 is referred to as "fiber-reinforced resin layer 25".

The fiber layer 21 formed on the tank vessel 10 contains the air introduced between the carbon fibers 20 during the process of winding the carbon fibers 20 and the air previously introduced with the thermosetting resin 22 in the carbon fibers 20. In the fluid state of the thermosetting resin 22 prior to curing during the thermal curing process, air bubbles 26 in the thermosetting resin 22 are made from the contained air and appear in the outer surface of the resin coat 23 formed on the surface of the fiber layer 21.

Figure 5A:
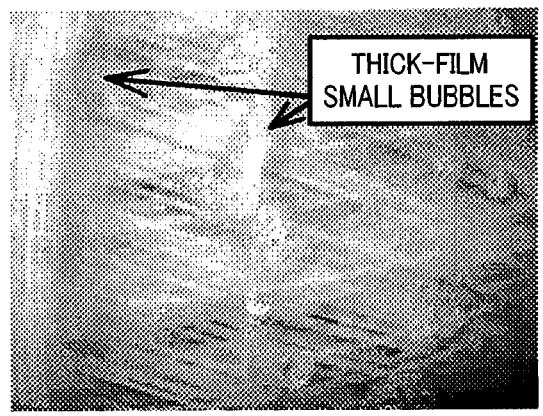
FIGS. 5A and 5B show images of air bubbles formed in resin coat.
Figure 5B:
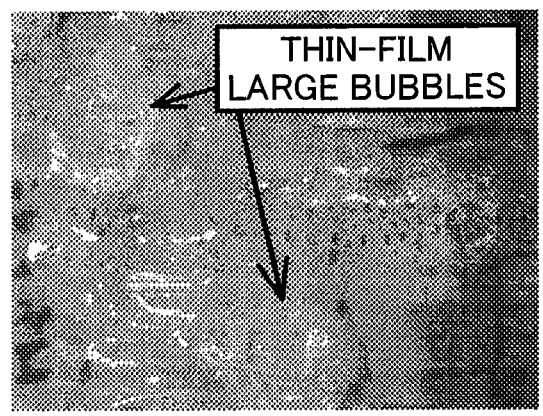

FIGS. 5A and 5B show images of air bubbles 26 appearing in the outer surface of the resin coat 23. The inventors of the present invention have found that the air bubbles 26 formed in the resin coat 23 are classified into two different types of air bubbles shown in FIGS. 5A and 5B. The air bubbles of FIG. 5A have relatively small size but large film thickness and are densely bunched. The air bubbles of FIG. 5B, on the other hand, have relatively large size but small film thickness. In the description hereinafter, the air bubbles in the type of FIG. 5A are called "thick-film small bubbles" and the air bubbles in the type of FIG. 5B are called "thin-film large bubbles". The inventors of the present invention have found that these thick-film small bubbles and thin-film large bubbles are formed in different time periods during the thermal curing process.

Figure 6:
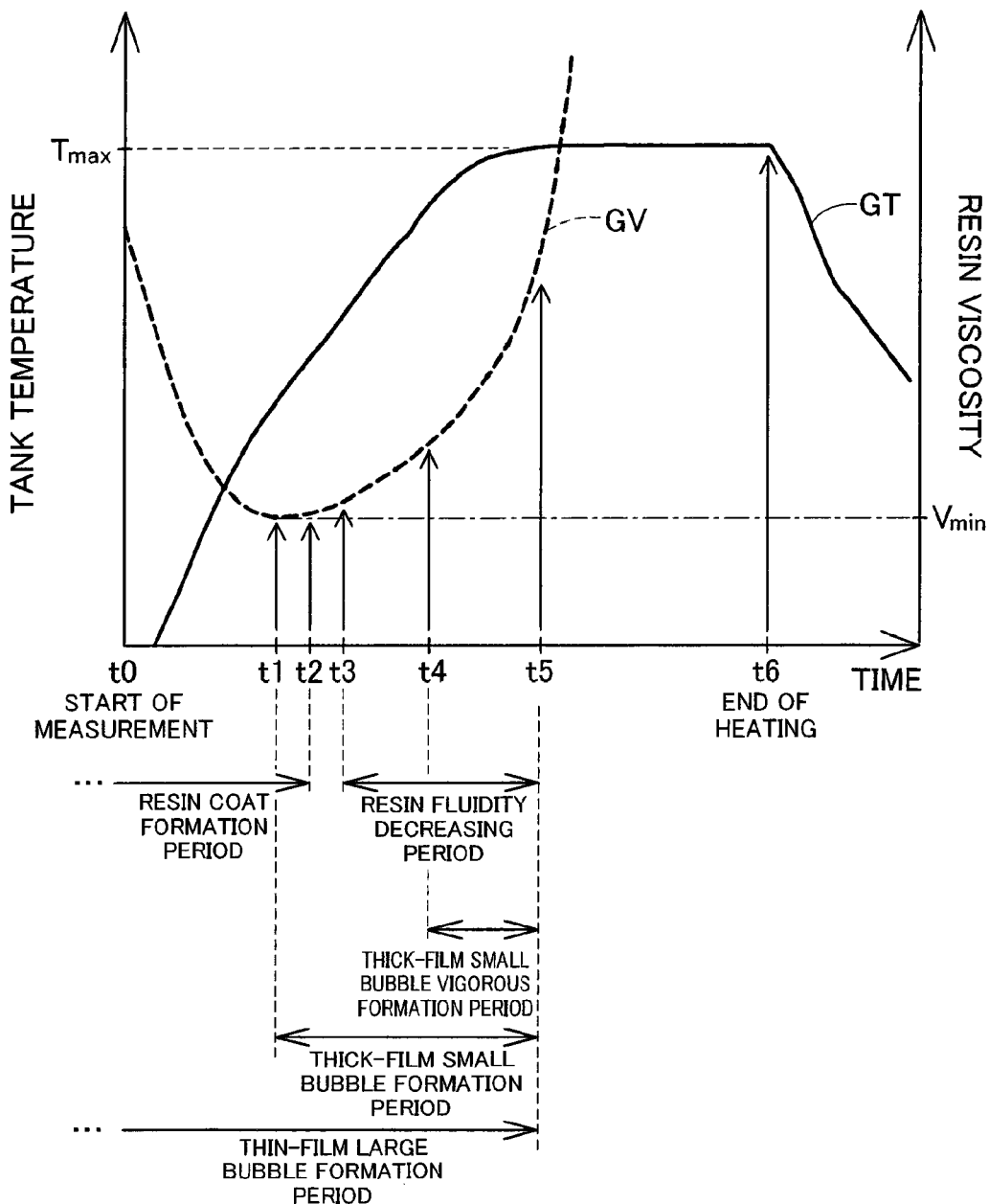
FIG. 6 is a diagram illustrating time periods when thick-film small bubbles and thin-film large bubbles are formed during the thermal curing process.

FIG. 6 is a diagram illustrating the time periods when the thick-film small bubbles and the thin-film large bubbles are formed during the thermal curing process. The graph of FIG. 6 shows a variation in temperature of the tank vessel 10 (tank temperature) during the thermal curing process, in relation to a variation in viscosity of the thermosetting resin 22 (resin viscosity), which have been obtained experimentally by the inventors. In the graph of FIG. 6, the abscissa shows the time elapsed since the start of the thermal curing process, and the two ordinates respectively show the tank temperature and the resin viscosity. The solid-line curve is a graph GT showing the time change of the tank temperature, and the broken-line curve is a graph GV showing the time change of the resin viscosity.

In the initial stage of the thermal curing process (time period between time t0 when the measurement starts and time t1), the resin viscosity decreases with an increase of the tank temperature. The resin viscosity reaches a minimum value Vmin at the time t1 and then starts rising. In other words, at the time t1, thermal curing of the thermosetting resin 22 starts with the progress of the cross-linking reaction. After the time t1, the graph GV of the resin viscosity increases along the downward convex curve. The tank temperature keeps increasing at a substantially constant rate after the time t1, reaches a maximum value Tmax at about time t5 and keeps the maximum value Tmax until time t6 when heating is terminated.

During the time period between the start of decreasing the viscosity of the thermosetting resin 22 and time t2 shortly after the start of increasing the viscosity of the thermosetting resin 22, the thermosetting resin 22 is released out to the surface of the fiber layer 21 to form the resin coat 23. In the description hereinafter, this time period is referred to as "resin coat formation period". At time t3 when formation of the resin coat 23 from the release of thermosetting resin 22 is substantially completed, the fluidity of the thermosetting resin 22 starts significantly decreasing. The thermosetting resin 22 is in the state of substantially no fluidity at time t5. In the description hereinafter, this time period between the time t3 and the time t5 is referred to as "resin fluidity decreasing period".

The thick-film small bubbles shown in FIG. 5A are formed in the time period between about the time t1 when the viscosity of the thermosetting resin 22 reaches its minimum and about the time t5 when the temperature of the tank vessel 10 reaches its maximum. Especially the thick-film small bubbles form vigorously in the time period between the time t4 shortly after the start of the resin fluidity decreasing period and the time t5. In other words, the thick-film small bubbles are formed after the viscosity of the thermosetting resin 22 once decreasing to the liquid level increases again to the gel level. The thick-film small bubbles formed in the resin coat 23 are rather persistent and tend to remain until completion of the thermal curing process.

The thin-film large bubbles shown in FIG. 5B are, on the other hand, formed in the time period between the start of decreasing the viscosity of the thermosetting resin 22 and about the time t5 when the thermosetting resin 22 is in the state of substantially no fluidity, and especially form vigorously in the state of low viscosity of the thermosetting resin 22. The thin-film large bubbles are not so persistent as the thick-film small bubbles, but the traces of the broken large bubbles tend to remain in the resin coat 23.

When the air bubbles 26 formed and moving to the resin coat 23, such as thick-film small bubbles and thin-film large bubbles, are not removed, the outer surface of the fiber-reinforced resin layer 25 has irregularities caused by the air bubbles 26. Such irregularities may undesirably cause the poor assembly of the high-pressure gas tank and adversely affect the aesthetic appearance of the high-pressure gas tank. The thermal curing device 100 of the embodiment accordingly performs the bubble removal process described below.

Figure 7:
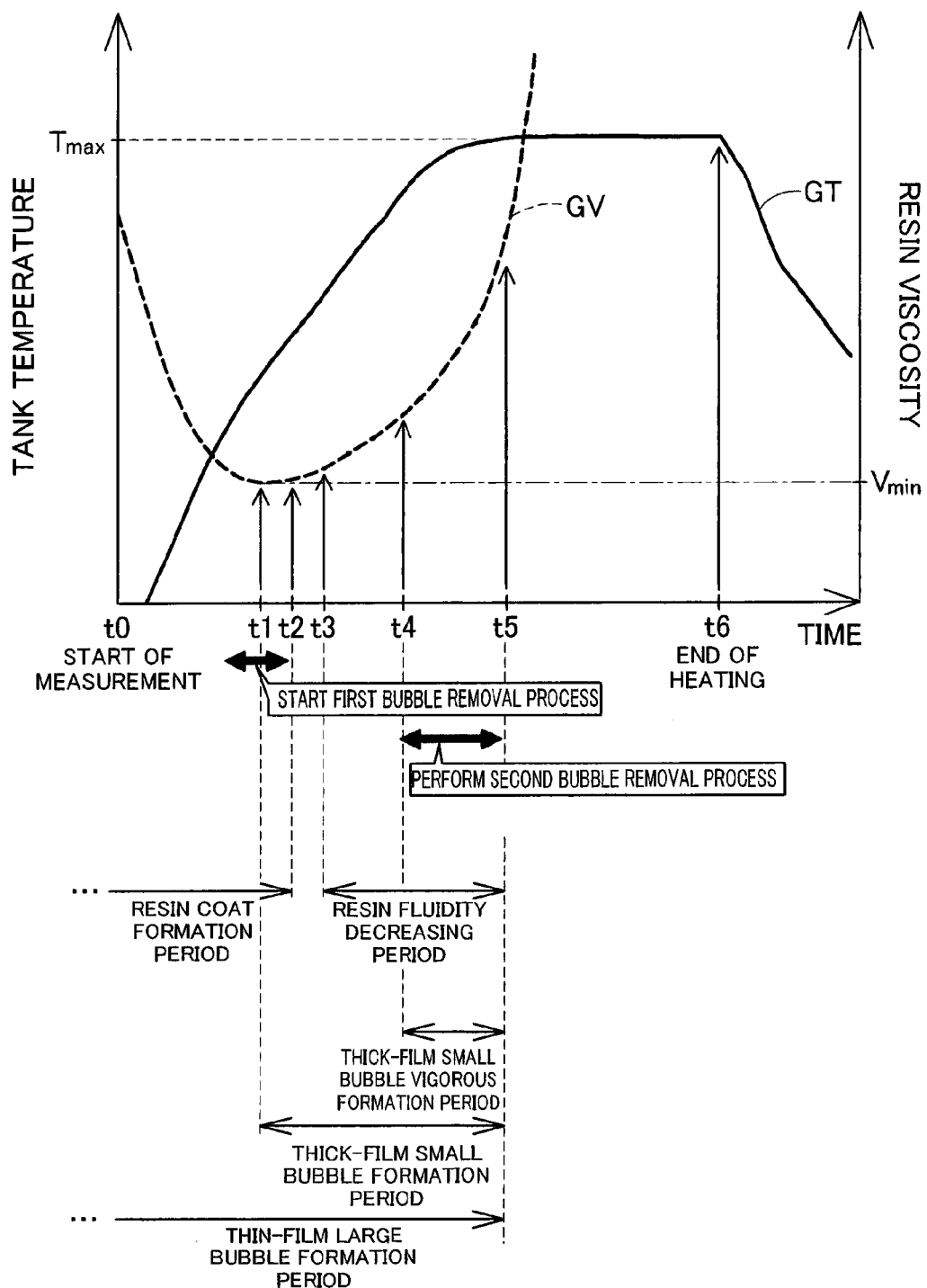
FIG. 7 is a diagram illustrating the timings of bubble removal process performed in the thermal curing device.

FIG. 7 is a diagram illustrating the timings of the bubble removal process performed in the thermal curing device 100 of the embodiment. FIG. 7 is similar to FIG. 6 with addition of the descriptions regarding the execution timings of the bubble removal process. The thermal curing device 100 of the embodiment performs two different types of processing (first and second bubble removal processes) at multiple different timings as the bubble removal process.

The time zone suitable for starting the first bubble removal process is shown by the double-headed arrow in FIG. 7. The time zone suitable for starting the second bubble removal process is also shown by the double-headed arrow in FIG. 7. The first bubble removal process preferably starts in the time period close to the time t1 when the viscosity of the thermosetting resin 22 reaches the minimum. The second bubble removal process, on the other hand, preferably performs in the time period between the time t4 and the time t5, i.e., the time period when the thick-film small bubbles are vigorously formed. The following describes the details of the first and second bubble removal processes.

Figure 8:
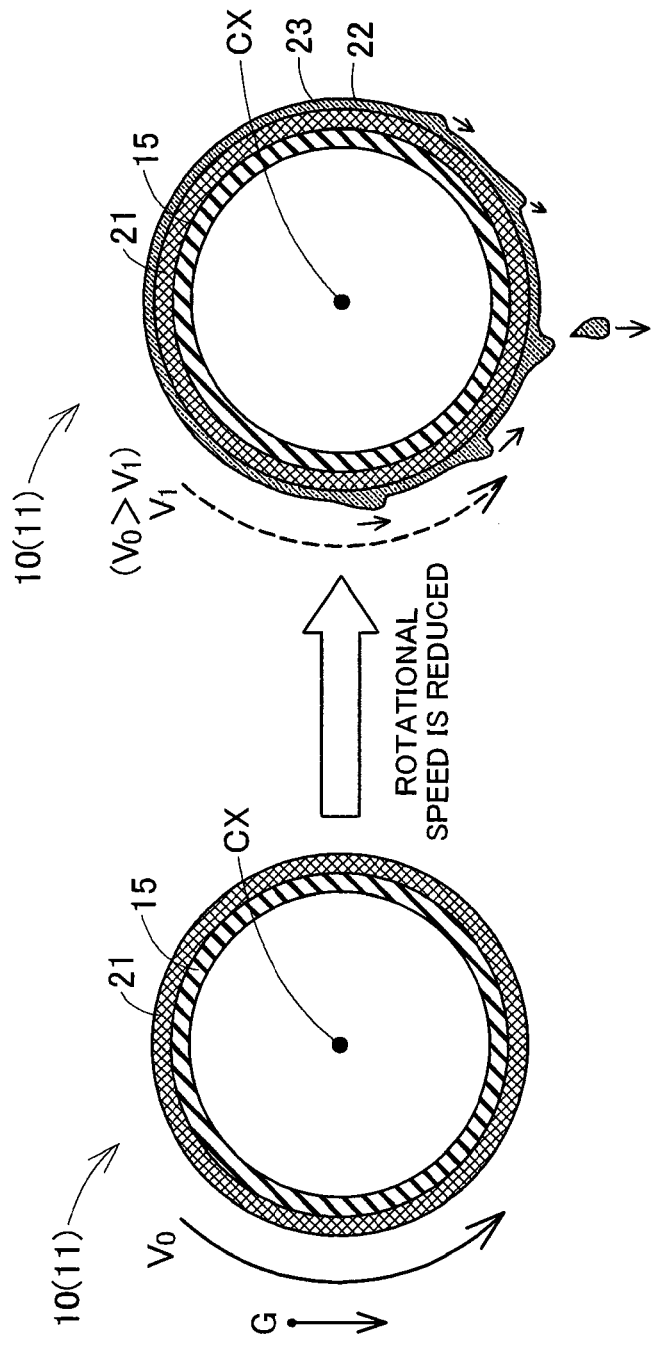
FIG. 8 is a diagram illustrating a first bubble removal process.

FIG. 8 is a diagram illustrating the first bubble removal process. The left and the right drawings of FIG. 8 are respectively sectional views schematically illustrating the cylinder section 11 of the tank vessel 10, taken on an arbitrary cross section perpendicular to the central axis C. The left drawing of FIG. 8 shows the state before the start of the first bubble removal process, and the right drawing of FIG. 8 shows the state after the start of the first bubble removal process. The arrow G in FIG. 8 indicates the direction of gravity.

In the thermal curing device 100, at the start of the thermal curing process, the tank vessel 10 starts rotating about the central axis CX at a specified rotational speed $V_0$. In the thermal curing device 100, rotating the tank vessel 10 in this manner prevents a temperature variation across the tank vessel 10. The rotational speed $V_0$ (hereinafter may be referred to as "default speed $V_0$") is preferably set to a speed level that does not cause the fluid of the thermosetting resin 22 to be splashed from the tank vessel 10.

In the thermal curing device 100, in the time period close to the time t1 (FIG. 7), the first bubble removal process decreases the rotational speed of the tank vessel 10 from the default speed $V_0$ to a rotational speed $V_1$ ($V_0>V_1$) (FIG. 8). In the time period close to the time t1, the resin coat 23 is formed from the thermosetting resin 22 in the state of high fluidity on the surface of the fiber layer 21. In this state, starting the speed control to decrease the rotational speed of the tank vessel 10 reduces the centrifugal force by the rotation of the tank vessel 10 and thereby increases the external force applied to the thermosetting resin 22 of the resin coat 23 in the direction of gravity. This causes the fluid of the thermosetting resin 22 in the resin coat 23 to flow in the direction of gravity and to be removed from the tank vessel 10.

The first bubble removal process accordingly reduces the amount of the thermosetting resin 22 contained in the resin coat 23 and thereby reduces the area, where the air bubbles 26 may be formed in the resin coat 23. After the first bubble removal process, formation of the air bubbles 26 is thus reduced in the surface of the fiber layer 21.

The rotational speed control in the first bubble removal process may control the rotational speed $V_1$ to temporarily decrease to 0, i.e., may perform control to intermittently stop the rotation of the tank vessel 10. The speed control in the first bubble removal process may not keep the controlled rotational speed $V_1$ at a fixed speed but may allow a variation in rotational speed $V_1$ in a range below the default speed $V_0$.

FIG. 9A is a diagram illustrating the operation by the air spray unit 130 (FIG. 3) performed in the first bubble removal process. FIG. 9A is a sectional view showing the tank vessel 10 after the rotational speed control, like the right drawing of FIG. 8. FIG. 9A schematically illustrates the state in which the air is sprayed from the nozzles 132 of the air spray unit 130 onto the tank vessel 10.

The first bubble removal process preferably sprays the air (compressed air) from the air spray unit 130 onto the tank vessel 10, in addition to the rotational speed control described above, in order to ensure the more effective removal of the thermal setting resin 22 from the tank vessel 10. Specifically, the air spray unit 130 is operated to spray the air to the fluid of the thermosetting resin 22 drooping from the tank vessel 10. More specifically, the air spray unit 130 may be operated to spray the compressed air from the nozzles 132 onto the lower part of the tank vessel 10 in the direction of gravity along the side wall surface of the cylinder section 11 of the tank vessel 10.

This causes the droplets of the thermosetting resin 22 drooping from the tank vessel 10 in the direction of gravity to be blown off by the air spray and effectively removes the thermosetting resin 22 from the tank vessel 10. The timing of starting the air spray operation from the air spray unit 130 may be during or after the rotational speed decreasing control of the tank vessel 10. The air spray operation may be continued for a predetermined period of time. Alternatively, any number of instantaneous air sprays may be made a plurality of times.

FIGS. 9B and 9C are diagrams illustrating other examples of the operation by the air spray unit 130 performed in the first bubble removal process. FIGS. 9B and 9C are similar to FIG. 9A, except the number and the locations of the nozzles 132 of the air spray unit 130. Spraying the air onto the tank vessel 10 by the air spray unit 130 may include the following air spray operation, in addition to or in place of the air spray operation described above with reference to FIG. 9A.

In the illustrated example of FIG. 9B, the air spray unit 130 may spray the air downward in the direction of gravity around the periphery of the cylinder section 11 of the tank vessel 10, so as to facilitate the flow of the thermosetting resin 22 in the direction of gravity. In this case, in order to facilitate the flow of the thermosetting resin 22, the nozzles 132 may be arranged to have their openings facing downward in the direction of gravity and make the air spray interfere with at least part of the tank vessel 10.

In the illustrated example of FIG. 9C, the air spray unit 130 may spray the air onto the lower part of the tank vessel 10 from two directions opposed to each other. More specifically, the air may be sprayed from the nozzles 132 arranged to be opposed each other and have their openings directions intersecting with each other in the lower part of the tank vessel 10. Spraying the air in this manner accumulates the thermosetting resin 22 at the lower end of the tank vessel 10 in the direction of gravity and thus facilitates removal of the thermosetting resin 22 from the tank vessel 10.

As described above, the first bubble removal process uses the external force to remove the thermosetting resin 22, which has the viscosity decreasing to the fluidizing level and is released out to the surface of the fiber layer 21, from the tank vessel 10. This reduces the amount of the thermosetting resin 22 contained in the resin coat 23 and thereby reduces the amount of bubbles 26 that may be formed in the surface layer of the tank vessel 10.

Figure 10:
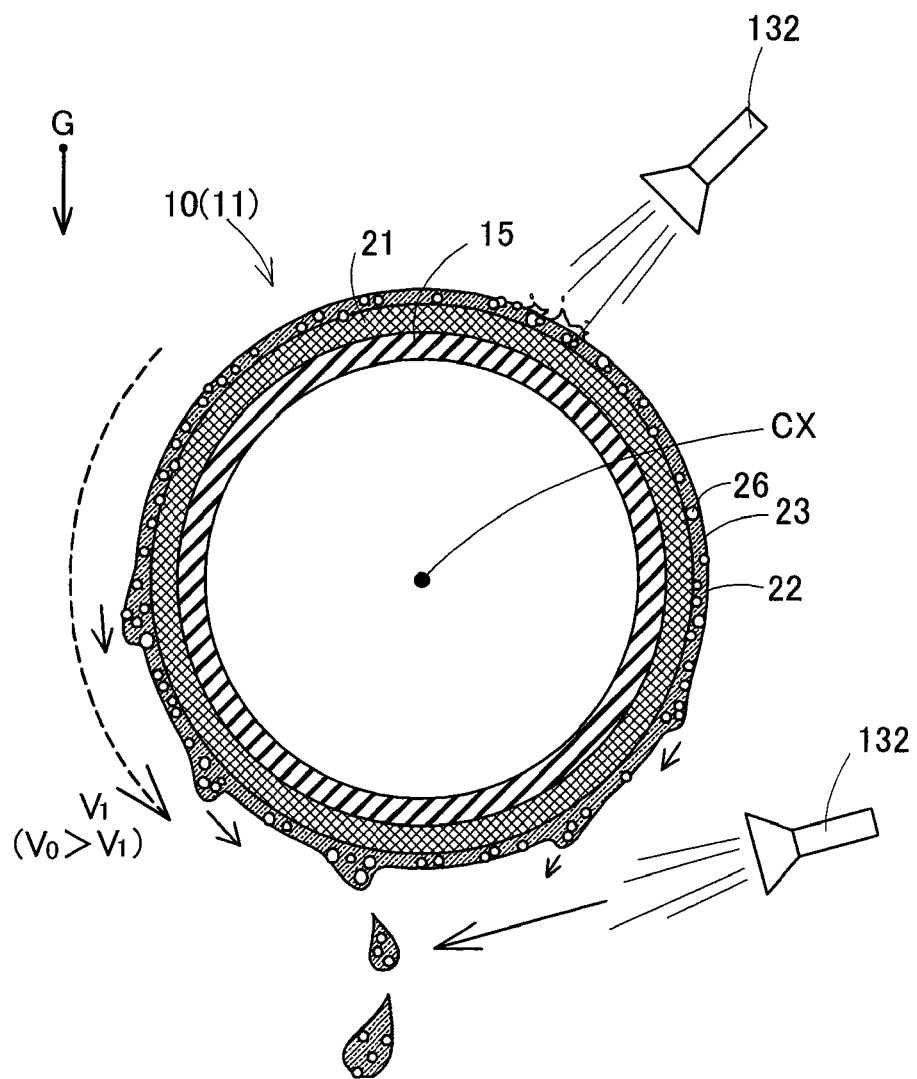
FIG. 10 is a diagram illustrating a second bubble removal process.

FIG. 10 is a diagram illustrating the second bubble removal process. FIG. 10 is similar to FIG. 9A, except additional illustration of formation of the air bubbles 26 in the resin coat 23 and the different number and locations of the nozzles 132 of the air spray unit 130. The second bubble removal process performs bubble breaking process to break the air bubbles 26 formed in the resin coat 23 by spraying the air from the air spray unit 130, while continuing the similar operation to that of the first bubble removal process.

The nozzles 132 used for the second bubble removal process are arranged to have their openings facing the outer surface of the tank vessel 10. The nozzles 132 used for the second bubble removal process may have the smaller opening diameter than the nozzles 132 used for the first bubble removal process.

As described previously with reference to FIG. 7, the second bubble removal process is performed in the time period when especially the thick-film small bubbles as one type of the air bubbles 26 are vigorously formed (i.e., time period between the time t4 and the time t5). The second bubble removal process sprays the air from the air spray unit 130 to break the air bubbles 26 formed in the resin coat 23. The second bubble removal process also continues the similar operation to that of the first bubble removal process described previously with reference to FIGS. 8 and 9. This effectively removes the thermosetting resin 22 from the tank vessel 10, together with the air bubbles 26 formed in the resin coat 23.

The second bubble removal process may spray the air to break the air bubbles at any arbitrary timings and any arbitrary number of times during the time period when the thick-film small bubbles are vigorously formed (i.e., the time period between the time t4 and the time t5). For example, the air for breaking the air bubbles may be sprayed at fixed time intervals during the above time period or may be sprayed in response to every detection of formation of the air bubbles 26.

The rotational speed control of the tank vessel 10 and the air spray operation for facilitating removal of the thermosetting resin 22, which are performed in the first bubble removal process, may be omitted from the second bubble removal process. Alternatively such operations similar to those of the first bubble removal process may be performed only in the first stage of the second bubble removal process (i.e., the time period between the time t4 and the time t5) and may be terminated in the latter stage when the fluidity of the thermosetting resin 22 significantly decreases.

Figure 11A:
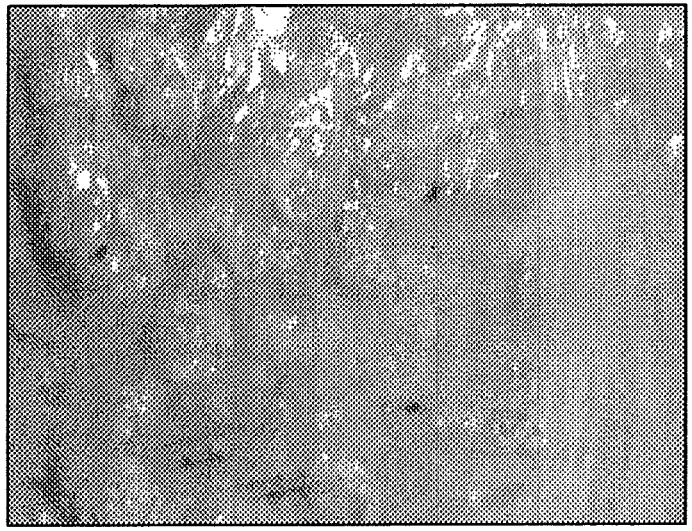
FIGS. 11A and 11B are images showing a change in state on the surface layer of the tank by the bubble removal process.
Figure 11B:

FIGS. 11A and 11B are diagrams illustrating a change in state on the surface layer of the tank vessel 10 by the bubble removal process of the embodiment. FIG. 11A shows an image of the surface layer of the tank vessel 10 after the thermal curing process performed without the first and the second bubble removal processes. FIG. 11B shows an image of the surface layer of the tank vessel 10 with the first and the second bubble removal processes performed during the thermal curing process.

As clearly understood from these images, the first and the second bubble removal processes reduce the irregularities caused by the air bubbles 26 on the outer surface of the tank vessel 10. Especially, in the bubble removal process of the embodiment, the second bubble removal process of spraying the air to break the air bubbles 26 is performed in the time period when the thick-film small bubbles are vigorously formed. This significantly reduces the relatively persistent thick-film small bubbles.

In the thermal curing device 100 of the embodiment, during the thermal curing process of the thermosetting resin 22, the first bubble removal process and the second bubble removal process are performed at respective adequate timings, so as to effectively prevent formation of the air bubbles 26 in the fiber-reinforced resin layer 25. This advantageously reduces the irregularities caused by the air bubbles 26 on the outer surface of the tank vessel 10.

Figure 12:
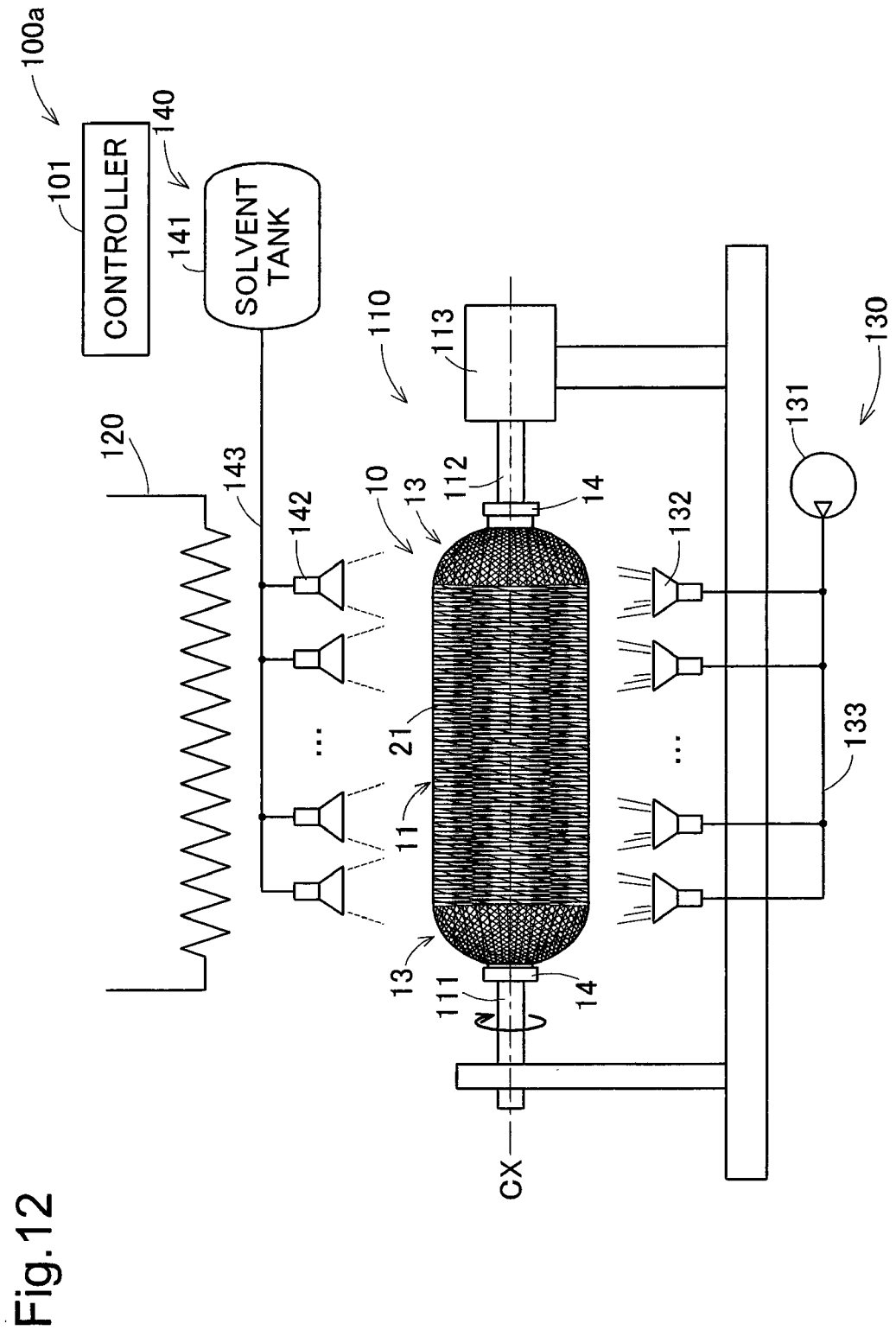
FIG. 12 schematically illustrates the structure of another thermal curing device according to another example.

FIG. 12 schematically illustrates the structure of another thermal curing device 100a as another example of the thermal curing device 100 according to the first embodiment. FIG. 12 is similar to FIG. 3, except addition of a solvent spray unit 140. The solvent spray unit 140 includes a solvent tank 141 configured to store a solvent used for dissolving the thermosetting resin 22, a plurality of nozzles 142 arranged to spray the solvent stored in the solvent tank 141 over the whole surface of the tank vessel 10, and a piping 143 arranged to connect the solvent tank 141 with the respective nozzles 142.

In the thermal curing device 100a of this structure, the solvent spray unit 140 is operated to spray the solvent for the thermosetting resin 22 onto the outer surface of the tank vessel 10 during the first and the second bubble removal processes. This dissolves the thermosetting resin 22 contained in the resin coat 23 to increase the fluidity of the thermosetting resin 22. This advantageously facilitates the flow and removal of the thermosetting resin 22 by the first bubble removal process and the breakage of the air babbles 26 by the second bubble removal process. The solvent may be sprayed from the solvent spray unit 140 only during either one of the first bubble removal process and the second bubble removal process or during both the first bubble removal process and the second bubble removal process.

B. Second Embodiment

Figure 13:
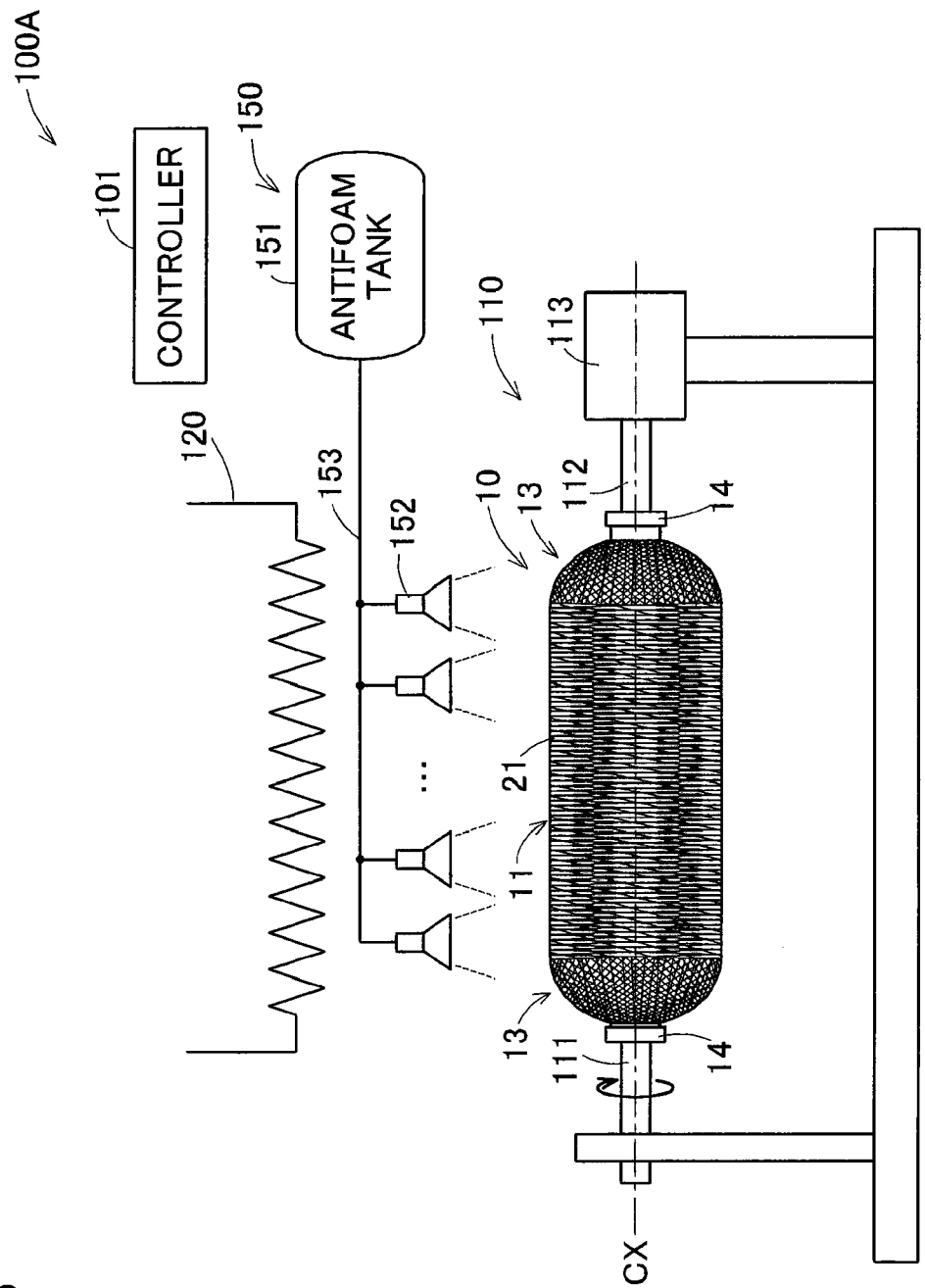
FIG. 13 schematically illustrates the structure of a thermal curing device according to a second embodiment.

FIG. 13 schematically illustrates the structure of a thermal curing device 100A according to a second embodiment of the invention. FIG. 13 is similar to FIG. 3, except an antifoam application unit 150 provided in place of the air spray unit 130. The second embodiment manufactures a high-pressure gas tank (FIG. 1) by a similar procedure to that of the first embodiment described above, except the following differences. The thermal curing process performed by the thermal curing device 100A of the second embodiment is similar to the thermal curing process performed by the thermal curing device 100 of the first embodiment, except the different processing flow of the bubble removal process.

The antifoam application unit 105 included in the thermal curing device 100A of the second embodiment includes an antifoam tank 151 configured to store a resin solution serving as the antifoam, a plurality of spray nozzles 152 arranged to apply the antifoam and a piping 153 arranged to connect the antifoam tank 151 with the respective spray nozzles 152. The antifoam stored in the antifoam tank 151 may be, for example, a silicon resin solution.

The thermal curing device 100A of the second embodiment performs the bubble removal process to apply the antifoam onto the tank vessel 10 during the thermal curing process. Application of the antifoam during the thermal curing process facilitates breakage of the air bubbles 26 formed in the surface layer of the resin coat 23. Curing the resin component contained in the antifoam improves the surface smoothness of the fiber layer 21. Breakage of the air bubbles by application of the antifoam makes the traces of the broken bubbles less noticeable and is thus especially effective for the thin-film large bubbles.

Figure 14:
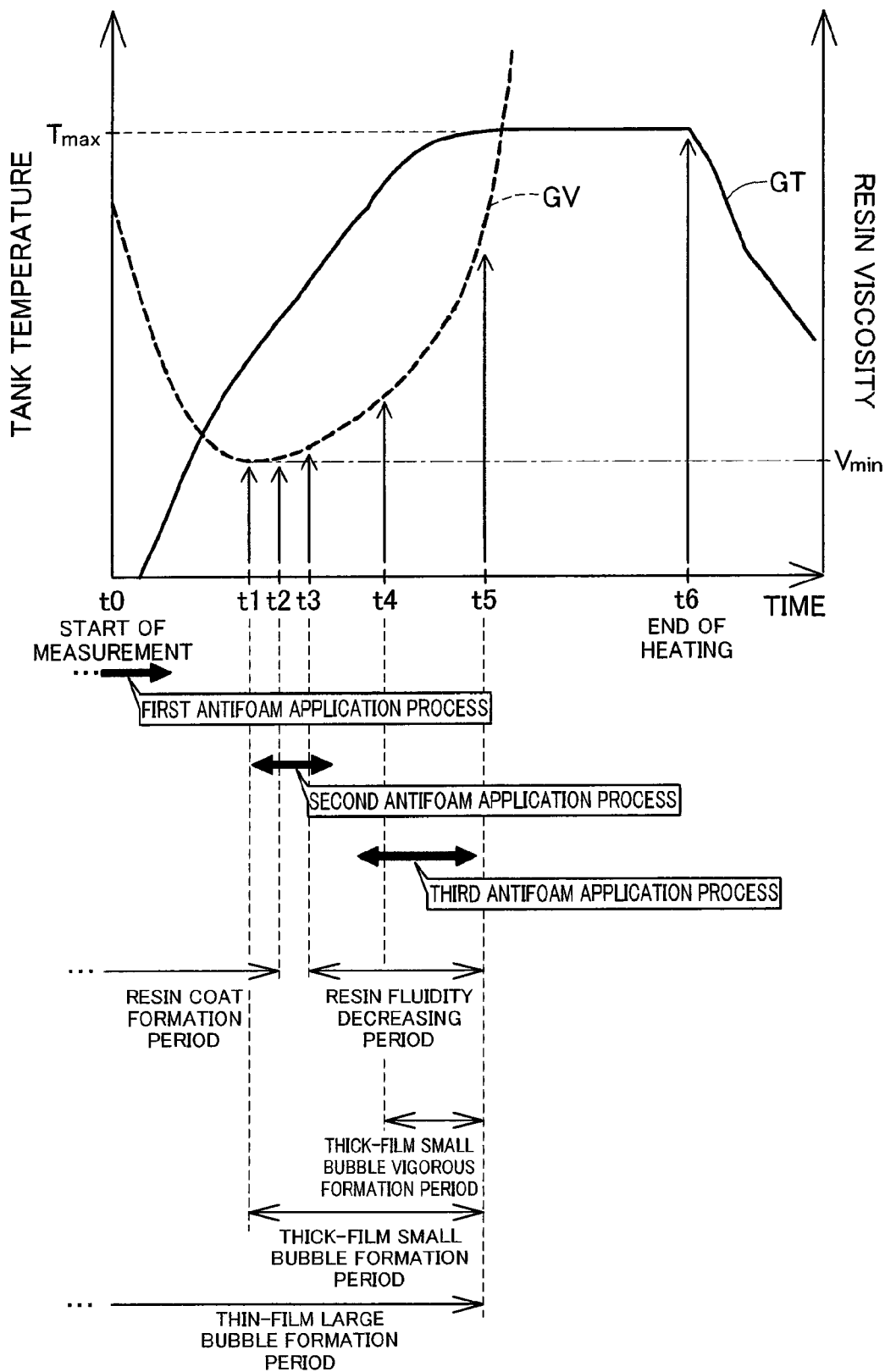
FIG. 14 is a diagram illustrating the timings of bubble removal process performed in the thermal curing device according to the second embodiment.

FIG. 14 is a diagram illustrating the timings of the bubble removal process performed in the thermal curing device 100A of the second embodiment. FIG. 14 is similar to FIG. 7, except different descriptions regarding the execution timings of the bubble removal process. The thermal curing device 100A of the second embodiment performs application of the antifoam as the bubble removal process in three different adequate time periods during the thermal curing process as described below.

The first antifoam application process is preferably performed in a time period prior to time t1, i.e., the time period when the viscosity of the thermosetting resin 22 starts decreasing after the start of the thermal curing process and the thermosetting resin accordingly has relatively low fluidity. More specifically, the first antifoam application process is preferably performed in the initial stage where the thermosetting resin 22 starts being released out to the surface of the resin layer 21 (first stage in the resin coat formation period). The air bubbles, such as the thin-film large bubbles, formed in the initial stage of the thermal curing process can be broken at the earlier timing when the air bubbles are formed in the resin coat 23. This accordingly prevents the growth of the air bubbles in the surface layer of the resin coat 23.

The second antifoam application process is preferably performed in a time period close to time t2, i.e., the time period after the viscosity of the thermosetting resin 22 reaches the minimum (after the time t1) but before release of the thermosetting resin 22 to the surface of the fiber layer 21 is nearly terminated. Prior to the second antifoam application process, the antifoam applied by the first antifoam application process may be removed, together with the fluid of the thermosetting resin 22, from the tank vessel 10 as the viscosity of the thermosetting resin 22 decreases. The second antifoam application process, however, additionally applies the antifoam over the surface of the tank vessel 10, so as to compensate for the reduced bubble removal effect and the reduced smoothness improvement effect on the surface of the resin coat 23 by removal of the antifoam.

The third antifoam application process is preferably performed in a time period between time t3 and time t5, i.e., the time period after the viscosity of the thermosetting resin 22 starts increasing but before the thermosetting resin 22 is in the state of substantially no fluidity. In this time period, the viscosity of the thermosetting resin 22 increases with time. The increasing viscosity gradually interferes with fluidization and diffusion of the applied antifoam component in the resin coat 23 and thereby reduces the bubble removal effect by the antifoam.

The third antifoam application process locally applies a large quantity of the antifoam in the locations where the air bubbles 26 appear in the resin coat 23, so as to effectively break the air bubbles 26 formed in the resin coat 23. In the third antifoam application process, the antifoam may be applied in the locations where the presence of the air bubbles 26 is optically detected or may be applied at any arbitrary timings to the areas having the high probability of formation of the air bubbles 26.

Figure 15A:
FIGS. 15A and 15B are images showing a change in state on the surface layer of the tank by the bubble removal process according to the second embodiment.
Figure 15B:

FIGS. 15A and 15B are diagrams illustrating a change in state on the surface layer of the tank vessel 10 by the bubble removal process of the second embodiment. FIG. 15A shows an image of the surface layer of the tank vessel 10 during the thermal curing process with omission of the bubble removal process using the antifoam. FIG. 15B shows an image of the surface layer of the tank vessel 10 with the bubble removal process by application of the antifoam in the three stages as described above. As clearly understood from these images, the bubble removal process of the second embodiment effectively reduces the irregularities caused by the air bubbles 26 on the outer surface of the tank vessel 10. Especially the bubble removal process of the second embodiment reduces the noticeable traces of broken thin-film large bubbles in the surface layer of the tank vessel 10.

The carbon fibers 20 may be impregnated in advance with the antifoam, together with the thermosetting resin 22, before being wound on the tank vessel 10. When only the impregnating antifoam is used to obtain the bubble removal effect as shown by the image of FIG. 15, the carbon fibers 20 should be impregnated with a large quantity of antifoam. Addition of such a large quantity of antifoam to the thermosetting resin 22 may, however, undesirably degrade the strength of the fiber-reinforced resin layer 25.

The bubble removal process of the second embodiment applies the antifoam in the multiple stages at the adequate timings during the thermal curing process. Such application scheme enables only a small quantity of the antifoam to exert the desired bubble removal effect. This effectively prevents deterioration of the strength of the fiber-reinforced resin layer 25 by using the antifoam and also reduces an increase in manufacturing cost of the high-pressure gas tank by the FW method. As mentioned previously, curing the resin component contained in the antifoam applied on the surface advantageously improves the smoothness on the surface of the fiber-reinforced resin layer 25.

C. Third Embodiment

FIG. 16 schematically illustrates the structure of a thermal curing device 100B according to a third embodiment. FIG. 16 is similar to FIG. 13, except addition of an air spray unit 130. The third embodiment manufactures a high-pressure gas tank (FIG. 1) by a similar procedure to that of the second embodiment described above, except the following differences. The thermal curing process performed by the thermal curing device 100B of the third embodiment is similar to the thermal curing process performed by the thermal curing device 100A of the second embodiment, except the different processing flow of the bubble removal process. The air spray unit 130 included in the thermal curing device 100B of the third embodiment has the similar structure to that of the air spray unit 130 described in the first embodiment.

The thermal curing device 100 of the first embodiment performs the bubble removal process, which includes the rotational speed control of the tank vessel 10 and the air spray operation by the air spray unit 130 executed in a stepwise manner at the preset timings. This bubble removal process is especially effective to remove the thick-film small bubbles. The thermal curing device 100A of the second embodiment, on the other hand, performs the bubble removal process, which applies the antifoam at multiple different stages during the thermal curing process. This bubble removal process is especially effective to reduce the noticeable traces of the thin-film large bubbles.

The thermal curing device 100B of the third embodiment performs the bubble removal process of the first embodiment, in combination with the bubble removal process of the second embodiment, at multiple different stages. This effectively prevents formation of both the thick-film small bubbles and the thin-film large bubbles. The following describes a concrete procedure of the bubble removal process.

Figure 17:
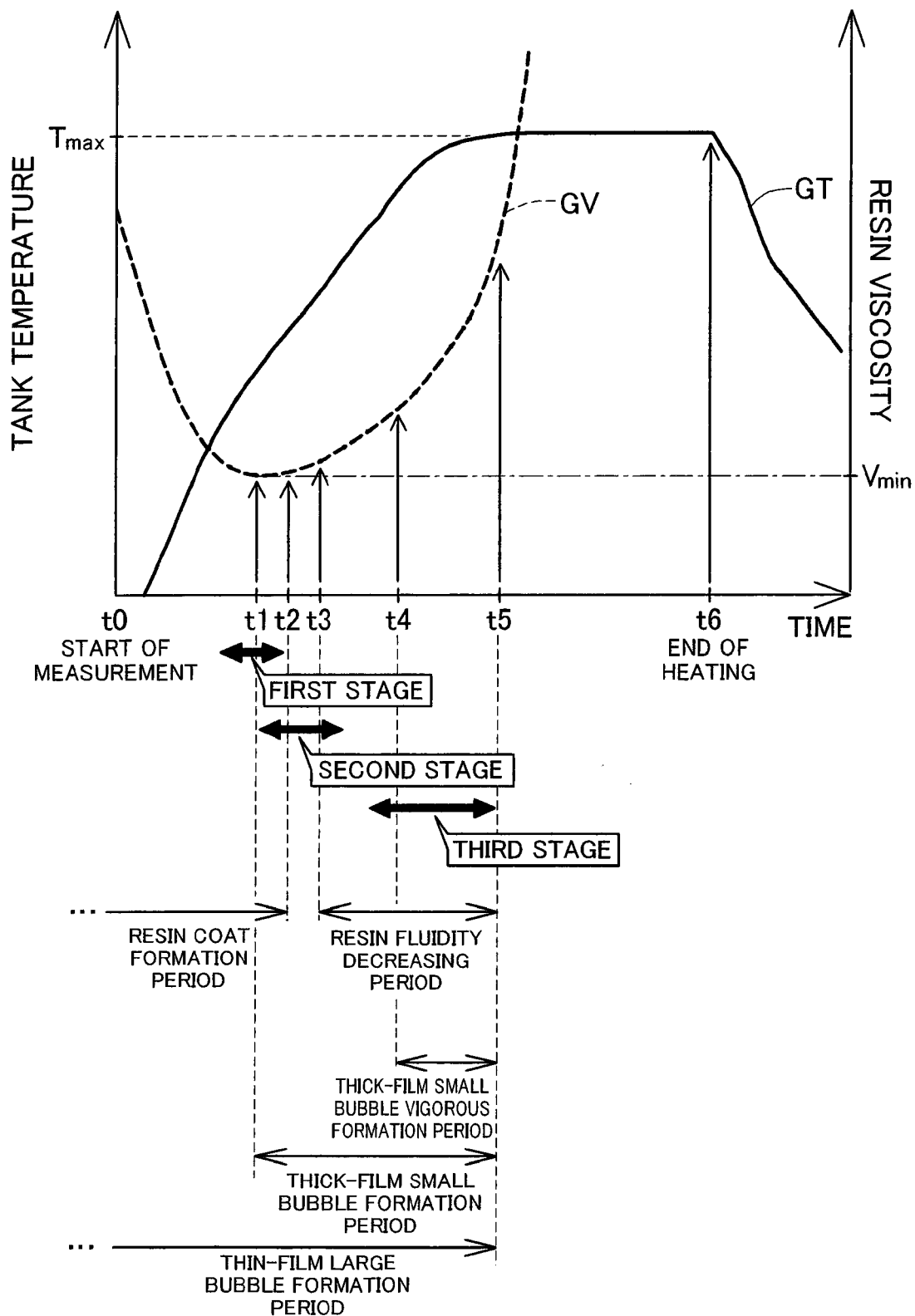
FIG. 17 is a diagram illustrating the timings of bubble removal process performed in the thermal curing device according to the third embodiment.

FIG. 17 is a diagram illustrating the timings of the bubble removal process performed by the thermal curing device 100B of the third embodiment. FIG. 17 is similar to FIG. 14, except different descriptions regarding the execution timings of the bubble removal process. The thermal curing device 100B of the third embodiment performs three different series of the bubble removal process at multiple different stages during the thermal curing process.

The bubble removal process at the first stage starts the operation for reducing the content of the thermosetting resin 22 contained in the resin coat 23, which is similar to the first bubble removal process described in the first embodiment, in a preferred time period similar to that described in the first embodiment. More specifically, the bubble removal process at the first stage starts the rotational speed control to decrease the rotational speed of the tank vessel 10 below the default speed $V_0$ and the air spray operation by the air spray unit 130 in a time period close to time t1 when the viscosity of the thermosetting resin 22 reaches the minimum. This reduces the content of the thermosetting resin 22 contained in the resin coat 23 and prevents formation of the air bubbles 26.

The bubble removal process at the second stage performs application of the antifoam on the outer surface of the tank vessel 10, which is similar to the second antifoam application process described in the second embodiment, in a preferred time period similar to that described in the second embodiment. More specifically, the bubble removal process at the second stage is performed in a time period close to time t2, i.e., the time period after the time t1 when the viscosity of the thermosetting resin 22 reaches the minimum but before release of the thermosetting resin 22 to the surface of the fiber layer 21 is nearly terminated. During the bubble removal process at the second stage, the rotational speed control of the tank vessel 10 and the air spray operation to the tank vessel 10 may be continuously performed as the bubble removal process at the first stage.

The bubble removal process at the third stage performs the process similar to the second bubble removal process described in the first embodiment and the process similar to the third antifoam application process described in the second embodiment. More specifically, the bubble removal process at the third stage performs breakage of bubbles by the air sprayed from the air spray unit 130 and breakage of bubbles by localized application of the antifoam by the antifoam application unit 150. The bubble removal process at the third stage is performed at any arbitrary timing in the time period after the viscosity of the thermosetting resin 22 starts increasing but before the thermosetting resin 22 is in the state of substantially no fluidity. Alternatively this bubble removal process at the third stage may be performed in the time period when thick-film small bubbles are vigorously formed (i.e., the time period between the time t4 and the time t5).

In the thermal curing device 100B of the third embodiment, the bubble removal process at the first stage and at the third stage may include application of the solvent, which is capable of dissolving the thermosetting resin 22, as described previously with reference to FIG. 12. Such solvent application scheme advantageously facilitates dissolution of the thermosetting resin 22, thus improving the bubble removal effect at the first stage and at the third stage.

As described above, the thermal curing device 100B of the third embodiment performs the process effective for preventing formation of the thick-film small bubbles, in combination with the process effective for preventing formation of the think-film large bubbles in a stepwise manner at the respective effective timings during the thermal curing process. The thermal curing device 100B of the third embodiment can thus more effectively prevents formation of the air bubbles 26 in the surface layer of the tank vessel 10 during the thermal curing process.

D. Modifications

The invention is not limited to the above embodiments or examples but various modifications and variations may be made to the embodiments without departing from the scope of the invention. Some of possible modifications are described below.

D1. Modification 1

Each of the bubble removal processes described in the above embodiments may be performed at different timings or in a different time period from those described in the above embodiments. Each of the bubble removal processes described above may be performed at multiple different stages during the thermal curing process of heating the tank vessel 10. Alternatively each of the bubble removal processes described above may be performed at multiple different stages with changing at least the execution timing or the processing flow, during the thermal curing process of heating the tank vessel 10. Performing the bubble removal process to prevent formation of the air bubbles 26 in the resin coat 23 during the thermal curing process as described in the above embodiment may allow omission of any surface treatment, such as cutting work, to finish the outer surface of the fiber-reinforced resin layer 25 after the thermal curing process. This advantageously avoids degradation of the fiber-reinforced resin layer 25 or deterioration of the strength of the fiber-reinforced resin layer 25 by the surface treatment, while reducing the manufacturing cost of the high-pressure gas tank.

D2. Modification 2

In the above embodiments, the bubble removal process is performed at preset multiple stages based on the variation in viscosity of the thermosetting resin 22. The bubble removal process may, however, not be essentially performed at a plurality of predetermined stages according to the variation in viscosity of the thermosetting resin 22. The bubble removal process may be performed at a plurality of predetermined stages according to the time elapsed since the start of the thermal curing process or may be performed at a plurality of predetermined stages according to the variation in temperature of the tank vessel 10 or the thermosetting resin 22 after the start of the thermal curing process. The bubble removal process may be performed at any specified multiple stages during the thermal curing process.

Additionally, the bubble removal process may determine the details of bubble removal process, for example, the type of bubble removal process and the start timing of bubble removal process, in response to detection of the state of the thermosetting resin 22 and may perform the bubble removal process at multiple different stages, based on the determined detailed. The "state of the thermosetting resin 22" here includes, for example, the state of air bubble formation in the thermosetting resin 22, a variation in flow rate of the thermosetting rate 22 on the surface layer of the tank vessel 10, and the thickness of the resin coat 23 formed on the surface layer of the tank vessel 10, in addition to a variation in viscosity of the thermosetting resin 22.

The thermal curing device may optically detect the state of the thermosetting resin 22 or may detect the state of the thermosetting resin 22 by reflection of a specific wave, such as ultrasonic wave, from the tank vessel 10. The details of the bubble removal process may be determined according to the state of the thermosetting resin 22 as described below.

In the first embodiment described above, the first bubble removal process may be triggered by detecting the flow of the thermosetting resin 22 on the surface layer of the tank vessel 10, for example, by an optical sensor. The first bubble removal process may change the rotational speed of the tank vessel 10 according to the flow rate of the thermosetting resin 22 on the surface layer of the tank vessel 10 or according to the amount of the thermosetting resin 22 removed from the tank vessel 10. The second bubble removal process may be triggered by optically detecting a preset number of air bubbles in a preset size in the tank vessel 10. Additionally, the process of applying the solvent, which is capable of dissolving the thermosetting resin 22, may be adequately performed according to the flow rate of the thermosetting resin 22 on the surface layer of the tank vessel 10.

In the second embodiment described above, one modified procedure may optically detect the flow rate of the thermosetting resin 22 on the surface layer of the tank vessel 10 and apply the antifoam at multiple different stages, for example, at the stage when the flow rate reaches a specified speed and at the stage when the flow rate is reduced below the preset speed. Another modified procedure may optically detect the flow amount of the thermosetting resin 22 on the surface layer of the tank vessel 10 and the state of air bubble formation and determine the timing and the amount of application of the antifoam, based on the optically detected flow amount and the state of air bubble formation. When multiple different types of antifoams are available, one modified procedure may select an adequate type among the multiple different types of antifoams, based on the flow state of the thermosetting resin 22 and the state of air bubble formation detected during the thermal curing process.

Additionally, the thermal curing device may select adequate processes among multiple different series of bubble removal processes provided in advance according to the state of the thermosetting resin 22 on the surface layer of the tank vessel 10 during the thermal curing process and start the selected processes at the timings of multiple adequate stages. For example, the thermal curing device may detect the thickness of the resin coat 23 formed on the surface layer of the tank vessel 10 with, for example, an optical sensor and may determine execution of the first bubble removal process of the first embodiment when the detected thickness of the resin coat 23 is greater than a predetermined reference thickness. The thermal curing device may determine no execution of the first bubble removal process when the detected thickness of the resin coast 23 is not greater than the predetermined reference thickness. When formation of thin-film large bubbles at a preset level is observed during the thermal curing process, the application of the antifoam may be selected and performed. When formation of thick-film small bubbles at a preset level is observed, on the other hand, the air spray operation to break the air bubbles may be selected and performed.

The determination of the details of the bubble removal process may be performed by the process determiner corresponding to the controller 101 included in any of the thermal curing devices 100, 100A and 100B. In any case, it is desirable to perform the bubble removal process at multiple different stages during the thermal curing process, whether the bubble removal process is one identical type of process or multiple different types of processes. The bubble removal process at the multiple stages effectively prevents formation of the air bubbles 26 in the resin coat 23.

D3. Modification 3

The first embodiment performs the process of reducing the content of the thermosetting resin 22 contained in the resin coat 23, in combination with the air spray operation to break the air bubbles 26, as the bubble removal process during the thermal curing process. The second embodiment performs the combination of the antifoam application operations performed at the multiple different start timings, as the bubble removal process. The third embodiment performs the process of reducing the content of the thermosetting resin 22 contained in the resin coat 23, in combination with the application of the antifoam and the air spray operation to break the air bubbles 26. The combination of the operations for the bubble removal process performed during the thermal curing process is, however, not limited to the combinations of these embodiments. For example, the rotational speed control of the tank vessel 10 described in the first embodiment may be performed in the antifoam application process of the second embodiment. In another example, the air spray operation to break the air bubbles described in the first embodiment may be performed in the antifoam application process of the second embodiment. The air spray operation to break the air bubbles may not be performed during the thermal curing process of the third embodiment. The preferable bubble removal process performed during the thermal curing process may be the combination of one identical type of bubble removal process performed at different timings or in different time periods like the second embodiment or may be the combination of different types of bubble removal processes like the first embodiment or the third embodiment.

D4. Modification 4

The second bubble removal process in the first embodiment or the bubble removal process at the third stage in the third embodiment sprays the air from the air spray unit 130 onto the tank vessel 10, so as to break the air bubbles 26. The bubble removal process performed during the thermal curing process may alternatively spray a fluid other than the air (for example, liquid) onto the tank vessel 10, in order to break the air bubbles 26.

D5. Modification 5

The first embodiment described above performs the rotational speed control of the tank vessel 10 and the operation of spraying the air onto the tank vessel 10, as the first bubble removal process. The first bubble removal process may be required to perform at least one of the rotational speed control of the tank vessel 10 and the operation of spraying the air onto the tank vessel 10 with omission of the other.

D6. Modification 6

In the first embodiment described above, the first bubble removal process performs the rotational speed control to decrease the rotational speed of the tank vessel 10. According to another embodiment, the first bubble removal process may perform another rotational speed control to increase the rotational speed of the tank vessel 10 from the default speed $V_0$ to such a rotational speed that the thermosetting resin 22 is splashed by the centrifugal force.

D7. Modification 7

In the first and the third embodiments described above, the fluid of the thermosetting resin 22 forming the resin coat 23 is removed from the tank vessel 10 by the rotational speed control of the tank vessel 10 and the air spray operation. The fluid of the thermosetting resin 22 forming the resin coat 23 may be removed (separated) from the tank vessel 10 by another method. Any external force other than the gravity or the external force applied by the fluid spraying operation may be used to remove the thermosetting resin 22 from the tank vessel 10. The direction of removal of the fluid of the thermosetting resin 22 is not limited to the direction of gravity. The fluid of the thermosetting resin 22 may be removed in a specific direction other than the direction of gravity by applying an external force in the specific direction.

D8. Modification 8

The second embodiment applies the antifoam on the tank vessel 10 during the thermal curing process. According to another embodiment, the carbon fibers 20 may be impregnated with the antifoam in addition to the thermosetting resin 22, before being wound on the tank vessel 10. According to yet another embodiment, the antifoam may be applied on the fiber layer 21 before the thermal curing process.

DESCRIPTION OF NUMBERS

10 . . . a tank vessel
11 . . . a cylinder section
13 . . . dome sections
14 . . . mouthpiece bases
20 . . . carbon fibers
21 . . . a fiber layer
22 . . . thermosetting resin
23 . . . resin coat
25 . . . fiber-reinforced resin layer
26 . . . air bubbles
100, 100A, 100B, 100a . . . a thermal curing device
101 . . . a controller
110 . . . a base assembly
111, 112 . . . tank fixing elements
113 . . . a rotary drive unit
120 . . . a heating unit
130 . . . an air spray unit
131 . . . a pump
132 . . . a plurality of nozzles
133 . . . a piping
140 . . . a solvent spray unit
141 . . . a solvent tank
142 . . . a plurality of nozzles
143 . . . a piping
150 . . . an antifoam application unit
151 . . . an antifoam tank
152 . . . a plurality of spray nozzles
153 . . . a piping

The invention claimed is:

1. A manufacturing method of a high-pressure gas tank, comprising steps of:
   (a) providing a tank configured to have a fiber layer formed on outer surface of the tank vessel by winding reinforcement fibers impregnated with a thermosetting resin; and
   (b) performing a thermal curing process that heats the tank vessel to thermally cure the thermosetting resin and thereby form a fiber-reinforced resin layer, and performing a bubble removal process for preventing formation of air bubble in the fiber-reinforced resin layer, in each of multiple periods during which the thermal curing process is performed;
   wherein the bubble removal process includes at least one of three type processes that are a first type of process that changes the rotational speed of the tank vessel while the tank vessel is rotating, a second type of process that sprays a fluid toward the tank vessel, and a third type of process that applies an antifoam onto a surface of the fiber layer, and
   the bubble removal process includes performing the same type process, which is selected from the three type processes, in each of multiple discontinuous periods.

2. The manufacturing method according to claim 1, wherein
   the multiple periods are set in advance according to a variation in viscosity of the thermosetting resin.

3. The manufacturing method according to claim 1, wherein
   the step (b) includes detecting state of the thermosetting resin and determining type of the bubble removal process, based on the detected state.

4. The manufacturing method according to claim 1, wherein
   the bubble removal process includes generating an external force for removing the thermosetting resin located on outer surface of the fiber layer from the tank vessel by performing the first type process or the second type process, when viscosity of the thermosetting resin changes to a specified viscosity level.

5. The manufacturing method according to claim 4, wherein
   the thermal curing process includes rotating the tank vessel during heating at a specified rotational speed, and
   the first type of process includes decreasing rotational speed of the tank vessel when the viscosity of the thermosetting resin changes to a first viscosity as the specified viscosity level and thereby facilitating the thermosetting resin located on the outer surface of the fiber layer to flow and fall by gravity from the outer surface of the fiber layer in direction of gravity.

6. The manufacturing method according to claim 4, wherein
   the first type of process is performed with the second type of process that includes spraying a fluid to the thermosetting resin located on the outer surface of the fiber layer, so as to remove the thermosetting resin from the fiber layer.

7. The manufacturing method according to claim 4, wherein
   the first type of process is performed with the second type of process that includes applying a solvent, which is capable of dissolving the thermosetting resin, onto surface of the fiber layer, so as to facilitate flow of the thermosetting resin.

8. The manufacturing method according to 1, wherein
the second type of process includes spraying a fluid to break air bubble formed in the thermosetting resin located on outer surface of the fiber layer.

9. The manufacturing method according to claim 8, wherein
the second type of process is performed after a start of the first type process and after the viscosity of the thermosetting resin changes to a specified second viscosity that is higher than the first viscosity.

10. The manufacturing method according to claim 1, wherein
the third type process includes applying a resin solution serving as the antifoam onto surface layer of the thermosetting resin.

11. The manufacturing method according to claim 10, wherein
the third type of process is performed at least a timing after a variation in viscosity of the thermosetting resin changes from a decreasing tendency to an increasing tendency.

12. The manufacturing method according to 10, wherein the third type of process is performed:
(i) at a first timing when a variation in viscosity of the thermosetting resin is in a decreasing tendency;
(ii) at a second timing after the variation in viscosity of the thermosetting resin changes from the decreasing tendency to an increasing tendency; and
(iii) at a third timing after the viscosity of the thermosetting resin increases above a viscosity level at the second timing.

13. The manufacturing method according to claim 10, wherein
the third type of process is performed at a timing after a start of the first process but before a start of the second process and at a timing when the viscosity of the thermosetting resin changes to the specified second viscosity.

14. The manufacturing method according to claim 1, wherein
the three type processes are performed on the entire tank vessel in each of multiple periods.

15. A manufacturing method of a high-pressure gas tank, comprising steps of:
(a) providing a tank configured to have a fiber layer formed on outer surface of the tank vessel by winding reinforcement fibers impregnated with a thermosetting resin; and
(b) performing a thermal curing process that heats the tank vessel to thermally cure the thermosetting resin and thereby form a fiber-reinforced resin layer, and performing a bubble removal process for preventing formation of air bubble in the fiber-reinforced resin layer, in each of multiple periods during which the thermal curing process is performed;
wherein the bubble removal process includes three type processes that are a first type of process that changes the rotational speed of the tank vessel while the tank vessel is rotating second type of process that sprays a fluid toward the tank vessel, and a third type of process that applies an antifoam onto a surface of the fiber layer, and
wherein the bubble removal process module performs different type processes, which are selected from the three type processes, in each of multiple parallel periods that are started at different times in each other.

16. The manufacturing method according to claim 15, wherein
the multiple periods are set in advance according to a variation in viscosity of the thermosetting resin.

17. The manufacturing method according to claim 15, wherein
the thermal curing process module includes a process determiner configured to detect state of the thermosetting resin and determine type of the bubble removal process, based on the detected state.

18. The manufacturing method according to claim 15, wherein
the bubble removal process module generates an external force for removing the thermosetting resin located on outer surface of the fiber layer from the tank vessel by performing the first type process or the second type of process, when viscosity of the thermosetting resin changes to a specified viscosity level.

19. The manufacturing method according to 15, wherein
the second type of process includes spraying a fluid to break air bubble formed in the thermosetting resin located on outer surface of the fiber layer.

20. The manufacturing method according to 15, wherein
the third type of process includes applying a resin solution serving as the antifoam onto surface layer of the thermosetting resin.

21. The manufacturing method according to claim 15, wherein
the three type processes are performed on the entire tank vessel in each of multiple periods.

* * * * *